(12) United States Patent
Buehler et al.

(10) Patent No.: US 7,904,861 B2
(45) Date of Patent: Mar. 8, 2011

(54) METHOD, SYSTEM, AND COMPUTER PROGRAM PRODUCT FOR COUPLED NOISE TIMING VIOLATION AVOIDANCE IN DETAILED ROUTING

(75) Inventors: Markus Buehler, Schonbuch (DE); Moussadek Belaidi, Fishkill, NY (US); James J. Curtin, Fishkill, NY (US); Adam P. Matheny, Beacon, NY (US); Bryan A. Meyer, South Pasadena, CA (US); Douglas S. Search, Red Hook, NY (US); Dhaval R. Sejpal, Austin, TX (US); Charles Vakirtzis, New Windsor, NY (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 11/762,130

(22) Filed: Jun. 13, 2007

(65) Prior Publication Data

US 2008/0313588 A1     Dec. 18, 2008

(51) Int. Cl.
  *G06F 17/50* (2006.01)
(52) U.S. Cl. ......... 716/108; 716/110; 716/111; 716/112; 716/113; 716/115; 716/126
(58) Field of Classification Search .......... 716/106–108, 716/110–115, 126
See application file for complete search history.

(56) References Cited

U.S. PATENT DOCUMENTS

| 6,029,117 | A | 2/2000 | Devgan |
| 6,117,182 | A | 9/2000 | Alpert et al. |
| 6,279,142 | B1 | 8/2001 | Bowen et al. |
| 6,467,069 | B2 | 10/2002 | Mehrotra et al. |
| 6,601,222 | B1 | 7/2003 | Mehrotra et al. |
| 7,137,097 | B1 | 11/2006 | Aji et al. |
| 2004/0078767 | A1* | 4/2004 | Burks et al. ............... 716/8 |
| 2005/0132309 | A1* | 6/2005 | Saxena et al. ............. 716/4 |
| 2005/0283750 | A1* | 12/2005 | Kosugi et al. ............. 716/11 |
| 2006/0010413 | A1* | 1/2006 | Curtin et al. ............. 716/9 |
| 2006/0026539 | A1* | 2/2006 | Tetelbaum et al. ......... 716/2 |
| 2007/0094623 | A1* | 4/2007 | Chen et al. .............. 716/4 |
| 2008/0244473 | A1* | 10/2008 | Parker et al. ............. 716/2 |
| 2009/0055787 | A1* | 2/2009 | Oh et al. ................ 716/6 |

OTHER PUBLICATIONS

Di Wu, et al., Coupling Aware Timing Optimization and Antenna Avoidance in Layer Assignment, ISPD '05, Apr. 3-6, 2005, San Francisco, CA, Copyright 2005, pp. 20-27.
Jingyu Xu, et al., A Coupling and Crosstalk Considered Timing-Driven Global Routing Algorithm for High Performance Circuit Design, Copyright 2004, pp. 677-682.
Prashant Saxena, et al., A Perturbation-aware Noise Convergence Methodology for High Frequency Microprocessors, Copyright 2005, pp. 717-722.
Charles J. Alpert, et al., Buffer Insertion for Noise and Delay Optimization, DAC 98, San Francisco, CA, Copyright 1998, pp. 362-367.

\* cited by examiner

*Primary Examiner* — Paul Dinh
(74) *Attorney, Agent, or Firm* — Cantor Colburn LLP; William Kinnaman

(57) ABSTRACT

A method, system, and computer program product for coupled noise timing violation avoidance in detailed routing of an integrated circuit design are provided. The method includes calculating a noise induced timing violation sensitivity (NITVS) metric for nets in the integrated circuit design as a measure of sensitivity to a timing violation relative to a coupled noise delay adder, prioritizing routing isolation as a function of the NITVS metric for each of the nets to avoid coupled noise timing violations, and outputting the routing isolation priority.

14 Claims, 18 Drawing Sheets

NDDx = NET DELAY DELTA APPORTIONMENT
= NET 'x' DELAY DELTA / PATH DELAY DELTA
= % OF PATH DELAY DELTA CONTRIBUTED BY NET 'x'

METHOD, SYSTEM, AND COMPUTER PROGRAM PRODUCT FOR COUPLED NOISE TIMING VIOLATION AVOIDANCE IN DETAILED ROUTING

BACKGROUND OF THE INVENTION

The present disclosure relates generally to integrated circuit design tools, and, in particular, to coupled noise timing violation avoidance in detailed routing.

As computer speeds have increased, and semiconductor technology dimensions have decreased, coupled noise effects on timing have correspondingly worsened. Faster switching speeds of advanced technologies have amplified higher frequency component contribution to signal spectra. An exchange of signal energy among capacitively coupled signal lines is most efficient for these higher frequencies. In addition, newer semiconductor technologies employ reduced lithography dimensions. The smaller shape sizes have resulted in reduced spacing between wires, and increased capacitive coupling between nets within integrated circuits.

As a result of these two effects, i.e., increased spectral coupling efficiency and increased capacitive coupling magnitude, advanced semiconductor technologies are becoming increasingly susceptible to coupled noise. Under the right circumstances of signal-to-signal synchronicity, a given amount of coupled noise energy results in a corresponding delay impact on signal timing. The probability that this change in delay will result in a timing violation increases as machine speeds increase and cycle times decrease. This situation develops because a given amount of noise-induced signal delta delay represents a greater threat to cycle time violation as the cycle times grow smaller, and the corresponding timing slack margins associated with those cycle time paths grow commensurately smaller as well.

The problem of minimizing the effect of coupled noise on design closure is often referred to in short hand as "noise avoidance". This terminology can be misleading, as it is not strictly necessary to avoid the creation of noise in order to avoid the destructive effects of noise on design timing closure. It is often not possible to completely eradicate the sources of noise and still construct a viable design. While it is true that if there is no coupled noise, there can be no effect of noise on logic path timing, to achieve such a result, every signal path would be required to be completely isolated from all other signal paths. Such isolation is expensive in terms of design resources. Preventing wires from coupling electrically has generally involved minimizing their physical adjacency. Traditionally, isolation has been accomplished by spreading wires apart; however, this approach consumes valuable track resources in the process. Such spreading often results in lengthened signal nets and additional path delay due to the parasitic effects of the increased net lengths. As a result, in attempting to avoid increased path delay due to coupled noise, the spreading solution imposes an additional path delay burden of its own, which is the very result the process was trying to avoid.

Most wire routing tools today execute routing in a two-step process. In the first step, a lower resolution approximate routing model (abstraction) is created and utilized in a global routing pass to develop routing guidelines and constraints for the detailed wiring step to follow. In this first step, global pass wires are not routed to specific wiring tracks, but rather are confined to sets of wiring channels that represent the guidelines or constraints for eventual track assignment. In the second step, called a detail routing pass, each net is defined by routing through specific track assignments, which generally follow the guidelines established by the first step global pass constraints.

There have been a number of approaches to avoiding the effects of coupled noise on timing, ranging from indiscriminant detail routing with maximal spreading of detail wires, to low resolution global routing constraint control of probabilistic coupling among detail wires. The approaches share two common characteristics, they address the noise-coupling problem by indirect methods, and they do not fully exploit the potential to optimally control the physical coupling of wires without incurring a timing violation penalty. Each approach attempts to minimize the impact of noise coupling on timing closure by applying physical adjacency avoidance, which may reduce noise impact in a simple general abstract sense, but lacks the acuity to solve the problem surgically and directly on a case-by-case basis.

Current global routing noise avoidance solutions are only partially effective in reducing the amount of noise-induced timing violations. Yield-oriented detail router spreading is not discriminatory with respect to noise-induced timing failures. Any improvement in the coupled noise situation is haphazard, random, and statistically derived. Current detail routing methods do not target minimization of noise-induced timing violations. Thus, when performing detailed routing within an integrated circuit, it would be beneficial to develop a method for allowing and tolerating specific configurations of coupled noise that permit maximal routing freedom, without degrading the design's timing target closure capability. Accordingly, there is a need in the art for coupled noise timing violation avoidance in detailed routing of an integrated circuit.

BRIEF SUMMARY OF THE INVENTION

Embodiments of the invention include a method for coupled noise timing violation avoidance in detailed routing of an integrated circuit design. The method includes calculating a noise induced timing violation sensitivity (NITVS) metric for nets in the integrated circuit design as a measure of sensitivity to a timing violation relative to a coupled noise delay adder, prioritizing routing isolation as a function of the NITVS metric for each of the nets to avoid coupled noise timing violations, and outputting the routing isolation priority.

Additional embodiments include a system for coupled noise timing violation avoidance in detailed routing of an integrated circuit design. The system includes a data storage device holding design data for the integrated circuit design and a host system in communication with the data storage device. The host system executes an integrated circuit routing tool (ICRT). The ICRT calculates a noise induced timing violation sensitivity (NITVS) metric for nets in the integrated circuit design as a measure of sensitivity to a timing violation relative to a coupled noise delay adder, prioritizes routing isolation as a function of the NITVS metric for each of the nets to avoid coupled noise timing violations, and outputs the routing isolation priority.

Further embodiments include a computer program product for coupled noise timing violation avoidance in detailed routing of an integrated circuit design. The computer program product includes a storage medium readable by a processing circuit and storing instructions for execution by the processing circuit for implementing a method. The method includes determining a noise induced timing slack status for nets in the integrated circuit design, calculating a noise induced timing violation sensitivity (NITVS) metric for each of the nets as a measure of sensitivity to a timing violation relative to a coupled noise delay adder, prioritizing routing isolation as a function of the noise induced timing slack status and the NITVS metric for each of the nets to avoid coupled noise timing violations, and outputting the routing isolation priority.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

Exemplary embodiments, as shown and described by the various figures and the accompanying text, provide a method, system and computer program product for coupled noise timing violation avoidance in detailed routing of an integrated circuit. In designing an integrated circuit, timing of signals on paths between internal elements is of critical importance. For example, an extended delay on certain paths can cause state machines to miss a transition or advance out of sequence, leading to erratic behavior and potential failure modes. When detailed routing is performed, physical connection paths between elements within the integrated circuit are determined through assigning paths to specific tracks. However, paths that are in close proximity to each other run a greater risk of susceptibility to coupled noise, which can also vary based upon the frequency of signals propagating through each path. Separate paths may have varying amounts of timing slack, i.e., margin for delay without violating timing constraints. When noise is coupled to a path with a small amount of timing slack, there may be an increased probability of failing to meet the timing constraints for the path. However, knowledge of timing slack for each path is not sufficient to accurately predict the effect of coupled noise on the path, as other factors are involved. For example, susceptibility to noise coupling can vary between paths, such that a path that has greater timing slack without noise can be at greater risk of a noise induced timing violation than a second path with less timing slack. An exemplary embodiment provides avoidance of coupled noise timing violations in detailed wire routing of integrated circuit designs, as described in greater detail herein.

In an exemplary embodiment, an integrated circuit design includes a number of paths, with each path including one or more nets, e.g., single net paths or multi-net paths. Each net in the design can be analyzed to determine timing slack with and without noise. In an exemplary embodiment, a noise induced timing violation sensitivity (NITVS) metric value is assigned to each net in the design. The NITVS metric includes two primary components. The first component is a path timing slack of each circuit without the effects of noise. The second component is a response of each circuit and net-pair timing segment in the design to a noise coupling scenario. Through these two components, a net-based prioritized order of coupled noise critically is established. In an exemplary embodiment, a set of physical coupling avoidance strategies is created, which vary in constraint strength. The strategies are applied during detailed routing in direct proportion to the prioritized coupled noise sensitivity value assigned to each net in the design. The resulting detailed routing establishes path routes that minimize the risk of coupled noise timing violations in the integrated circuit.

Figure 1:
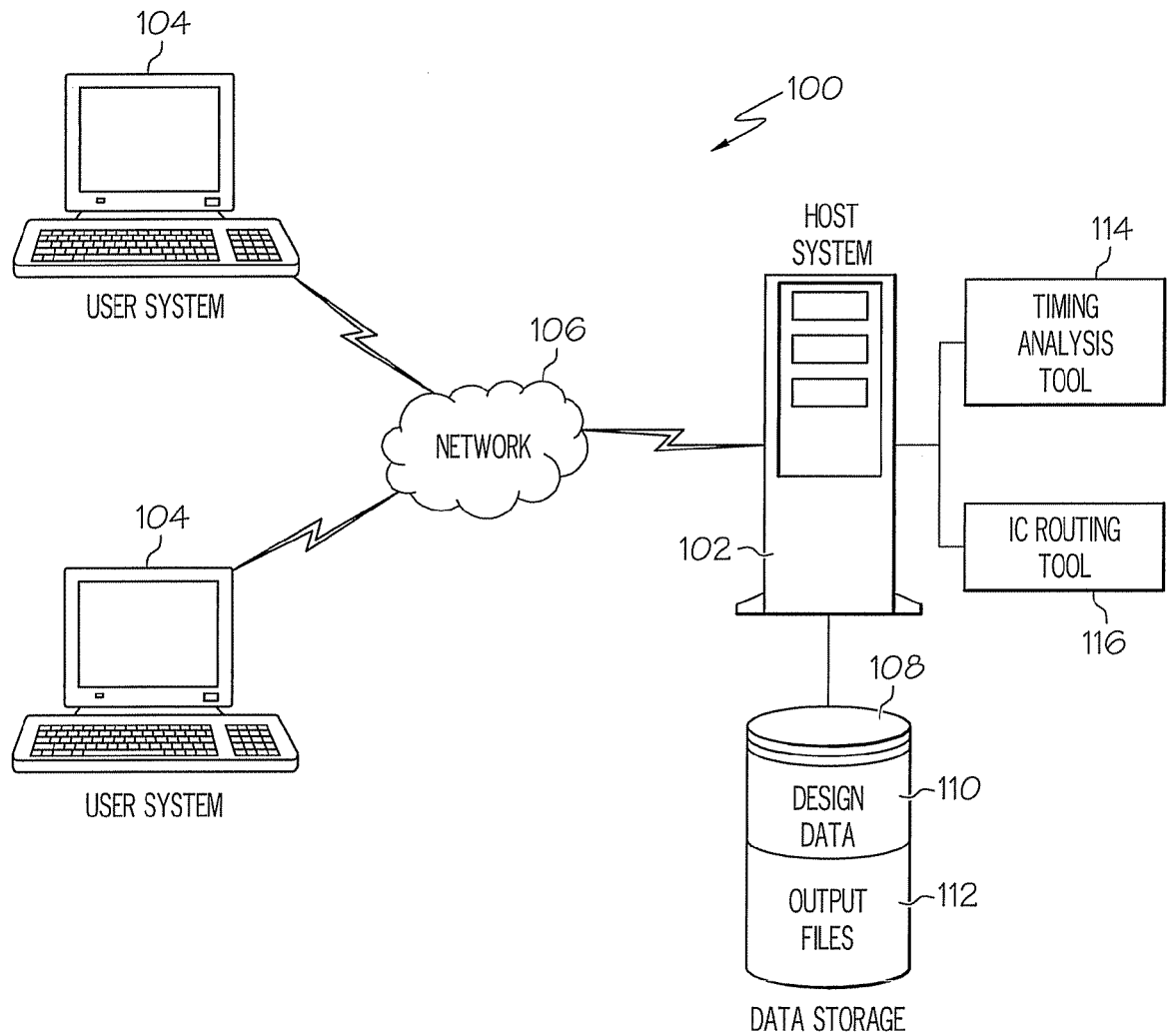
FIG. 1 depicts an exemplary system for coupled noise timing violation avoidance in detailed routing that may be utilized by an exemplary embodiment.

Turning now to the drawings, it will be seen that in FIG. 1 there is a block diagram of a system 100 upon which coupled noise timing violation avoidance in detailed routing is implemented in an exemplary embodiment. The system 100 of FIG. 1 includes a host system 102 in communication with user systems 104 over a network 106. The host system 102 may be a high-speed processing device (e.g., a mainframe computer), including a processing circuit for executing instructions, which handles processing requests from user systems 104. In an exemplary embodiment, the host system 102 functions as an application server and a data management server for integrated circuit design and development activities. User systems 104 may comprise desktop or general-purpose computer devices that generate data and processing requests, such as integrated circuit floor planning, placement, routing, and analysis requests. While only a single host system 102 is shown in FIG. 1, it will be understood that multiple host systems may be implemented, each in communication with one another via direct coupling or via one or more networks. For example, multiple host systems may be interconnected through a distributed network architecture. The single host system 102 may also represent a cluster of hosts accessing a common data store, e.g., via a clustered file system that is backed by a data storage device 108. In an exemplary embodiment, the host system 102 is directly user accessible without communication through the network 106, e.g., where the host system 102 is embodied in a desktop computer or workstation.

The network 106 may be any type of communications network known in the art. For example, the network 106 may be an intranet, extranet, or an internetwork, such as the Internet, or a combination thereof. The network 106 can include wireless, wired, or fiber optic links.

The data storage device 108 refers to any type of storage and may comprise one or more secondary storage elements, e.g., a hard disk drive or tape storage system that is external to the host system 102. In an alternate exemplary embodiment, the data storage device 108 is internal to the host system 102. Types of data that may be stored in the data storage device 108 include databases and/or files of design data 110. In an exemplary embodiment, the design data 110 include integrated circuit design and modeling data, such as net lists and noise models. It will be understood that the data storage device 108 shown in FIG. 1 is provided for purposes of simplification and ease of explanation and is not to be construed as limiting in scope. To the contrary, there may be multiple data storage devices utilized by the host system 102.

In an exemplary embodiment, the host system 102 executes various applications, including a timing analysis tool (TAT) 114, and an integrated circuit routing tool (ICRT) 116. Other applications, e.g., electronic design automation (EDA) software, business applications, a web server, etc., may also be implemented by the host system 102 as dictated by the needs of the enterprise of the host system 102. All or a portion of the TAT 114 and the ICRT 116 may be located on a user system 104 with processing shared between the user systems 104 and the host system 102, e.g., a distributed computing architecture. In addition, all or a portion of the data utilized by the TAT 114 and the ICRT 116, such as the design data 110, may be located on the user systems 104. The TAT 114 and the ICRT 116 may be implemented as a stand-alone application, a plug-in, a module, or an executable script in a development environment. Although the TAT 114 and the ICRT 116 are depicted separately, it will be understood that they can be combined or further partitioned within the scope of the invention.

In an exemplary embodiment, the user systems 104 access the host system 102 to request coupled noise timing violation avoidance in detailed routing on the design data 110, while designing an integrated circuit. The user systems 104 may also access the host system 102 to create or modify the design data 110 using other EDA software (not depicted). In an exemplary embodiment, the TAT 114 performs timing and noise analysis for nets in an integrated circuit design captured in the design data 110. The TAT 114 may support a variety of noise models for noise coupled timing analysis. In an exemplary embodiment, the TAT 114 updates the design data 110 to include net timing distribution data with and without coupled noise. The ICRT 116 analyzes the design data 110, determining detailed routing constraints and priorities to minimize coupled noise timing violations in designing an integrated circuit, and outputting the results to the output files 112.

Figure 2A:
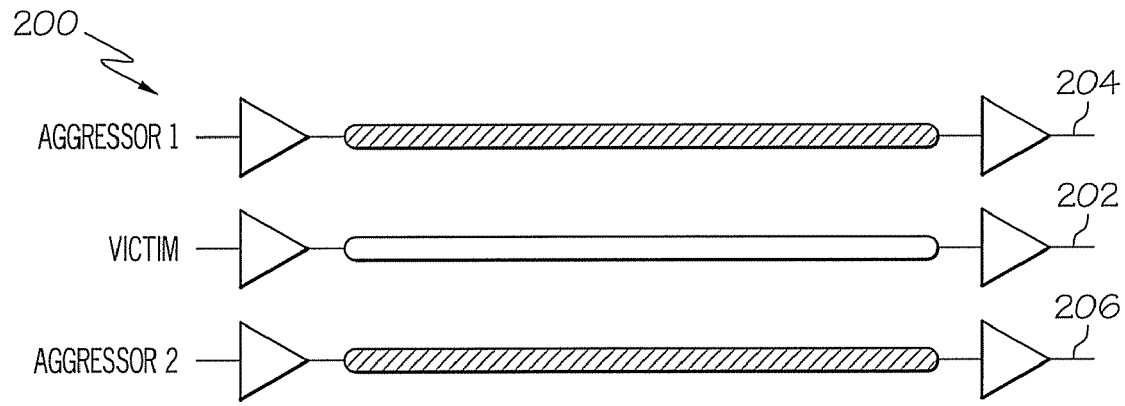
FIG. 2A-C depict exemplary signal connection models.
Figure 2B:
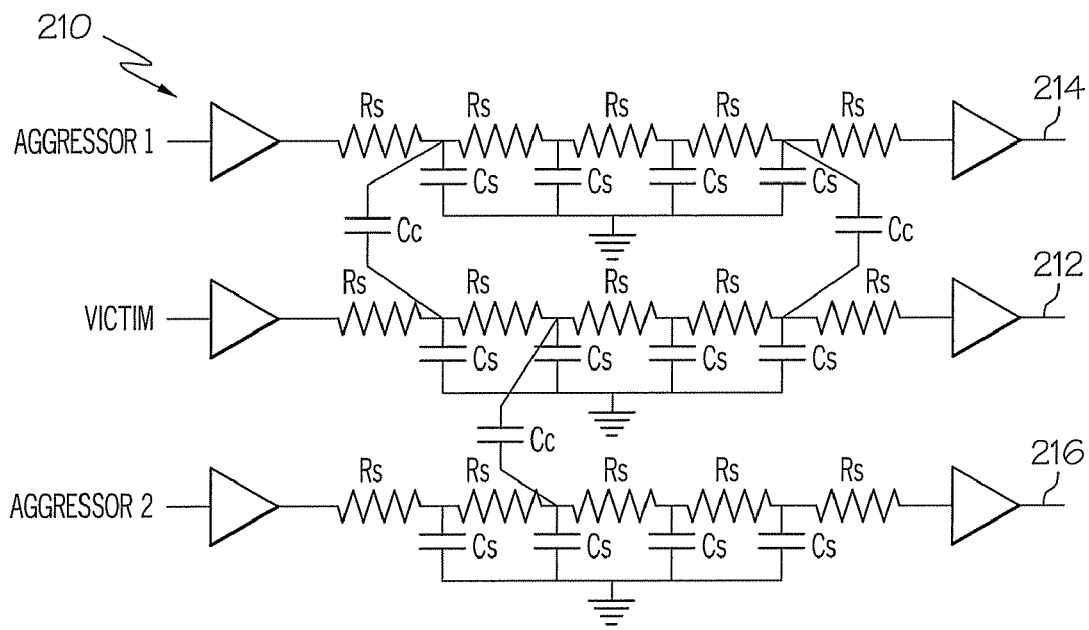
Figure 2C:
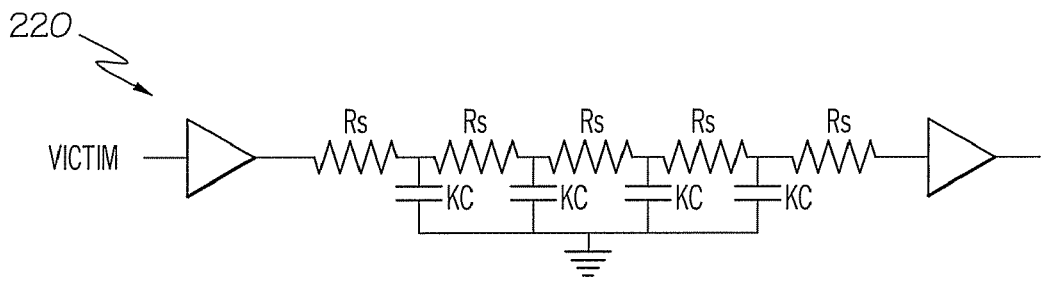

Turning now to FIGS. 2A-C, exemplary signal connection models are depicted. In FIG. 2A, a physical model 200 is depicted as a victim 202 and two aggressors 204 and 206. The two aggressors 204 and 206 are representative of two neighboring paths in close physical proximity to the victim 202 within an integrated circuit. In an exemplary embodiment, noise on the two aggressors 204 and 206 is coupled to the entire path length of the victim 202. FIG. 2B depicts a static timing model 210 that models a victim 212 and two aggressors 214 and 216 as resistor-capacitor (RC) networks. The two aggressors 214 and 216 are capacitively coupled to the victim 212. While noise coupling between the physically separate signal paths of FIG. 2A can be modeled using simple RC networks as depicted in FIG. 2B, it will be understood that more advanced noise coupling models may be used within the scope of the invention, such as the inclusion of self and mutual inductance.

FIG. 2C depicts a combined model of the victim 212 and the two aggressors 214 and 216 of FIG. 2B as a noise model 220. In an exemplary embodiment, the noise model 220 is a simple RC network. The "K" multipliers on the capacitors in the noise model 220 may be used to adjust self-capacitance so as to compensate for the performance impact of the coupled noise, as caused by the two adjacent aggressors 214 and 216 of FIG. 2B. Each net or path within an integrated circuit design may have different model element values (e.g., resistors and capacitors) resulting in different path or net specific noise models 220. In an alternate exemplary embodiment, a common worst-case noise model 220 is applied to all paths or nets. Since isolation prioritization for routing the nets is based on the relative sensitivities of nets to noise induced timing violations, the precise values of model elements in the noise model 220 are not critically important, as long as the relative priorities are maintained accurately between modeled nets and/or paths.

Figure 3:
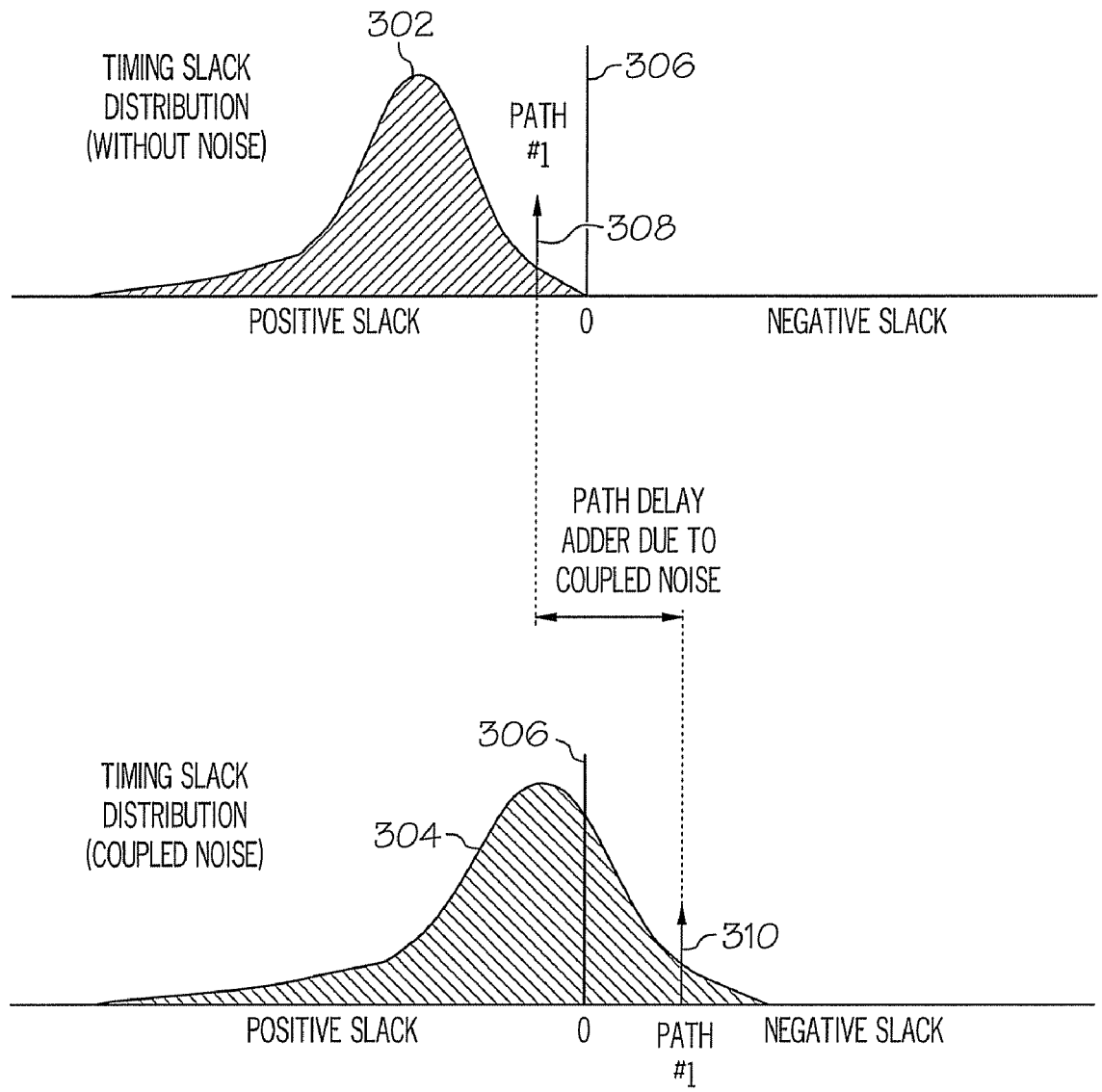
FIG. 3 depicts exemplary timing slack distributions, with and without coupled noise.

Tuning now to FIG. 3, two exemplary timing slack distributions 302 and 304 are depicted. In an exemplary embodiment, the TAT 114 of FIG. 1 produces the timing slack distributions 302 and 304 for a given integrated circuit design. The TAT 114 of FIG. 1 may apply the noise model 220 of FIG. 2C to the nets within the timing slack distribution 302 during timing analysis to produce the coupled noise timing slack distribution 304. In an exemplary embodiment, the TAT 114 of FIG. 1 establishes a timing baseline to create the timing slack distribution 302 by executing timing on the design data 110 of FIG. 1 with no noise coupling effects, using Steiner routes for nets. The timing analysis can be done either by accessing empirical data and characterizing the statistics, or by declaring a net length coupling factor as a function of net length. Modeled noise coupling is converted into a "K" value capacitor multiplier for each net in the integrated circuit design, in accordance with the noise model 220 of FIG. 2C. In an exemplary embodiment, the timing slack distributions 302 and 304 are analyzed relative to a timing slack threshold 306. As depicted in FIG. 3, values further to the left of the timing slack threshold 306 indicate greater positive timing slack, while values further to the right indicate greater negative timing slack, and the timing slack threshold 306 represents zero timing slack. In order to maintain timing within design constraints, paths within an integrated circuit should not have negative slack. As can be seen in the example of FIG. 3, the timing slack distribution 302 has no negative timing slack. Once noise is introduced, a portion of resulting coupled noise timing slack distribution 304 shifts beyond the timing slack threshold 306, indicating that some paths have negative timing slack. For example, path one 308 in the timing slack distribution 302 has positive timing slack, but appears as path one 310 in the coupled noise timing slack distribution 304 with negative timing slack. The relative timing shift between the path one 308 and path one 310 represents a path delay adder due to coupled noise for the given path. The path delay adder value may vary between each path in an integrated circuit design depending on the particular susceptibility to coupled noise for each path. The path delay adder is also generically referred to as a coupled noise delay adder, which encompasses noise-induced delays for paths, nets, or a subgroup of nets.

Figure 4:
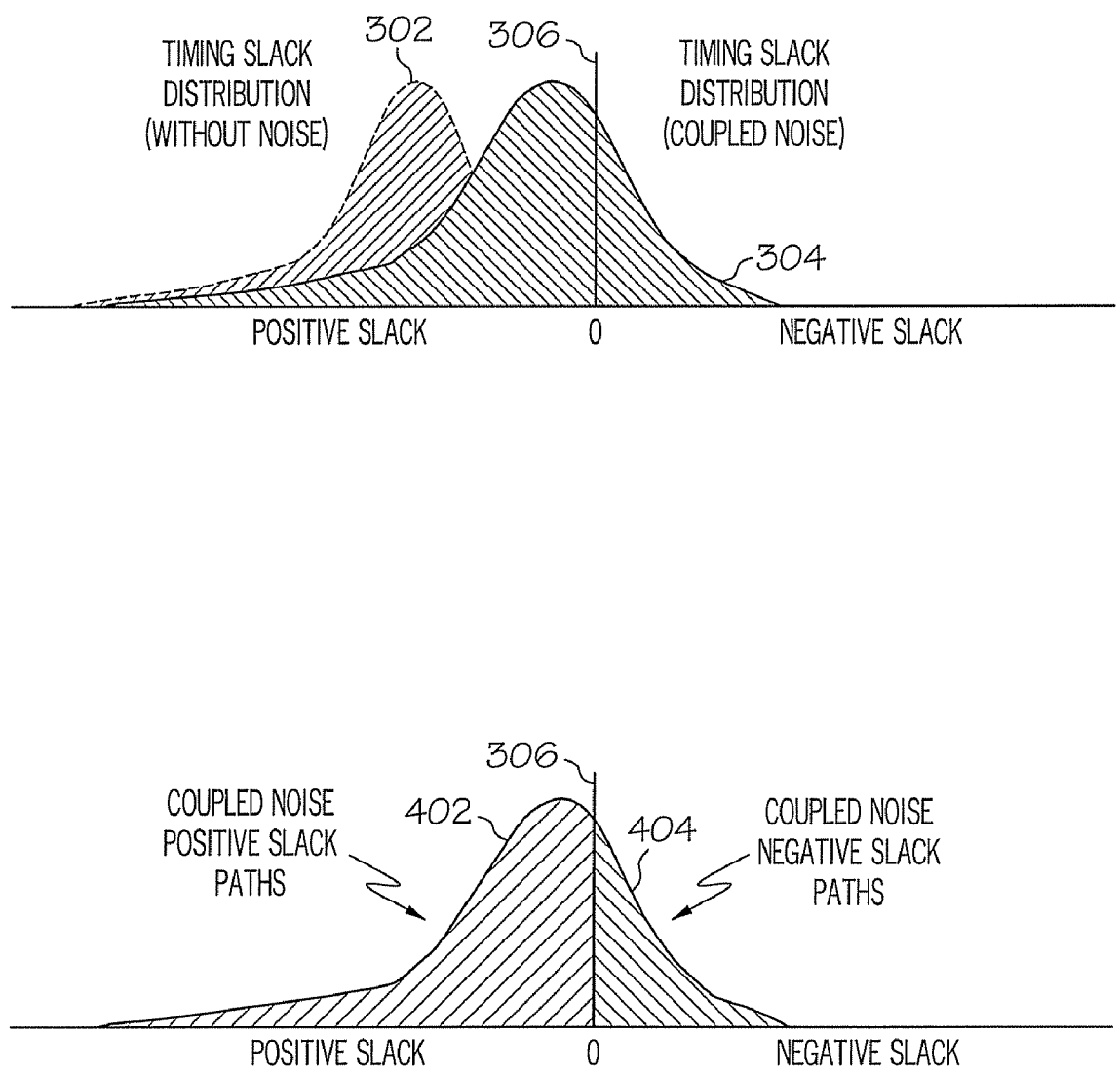
FIG. 4 depicts an exemplary grouping of nets with coupled noise from a timing slack distribution.

The concept of positive and negative timing slack is graphically depicted in FIG. 4, with different shading for the positive timing slack region 402 and the negative timing slack region 404 of the coupled noise timing slack distribution 304. The group of nets within the negative timing slack region 404 are the primary focus, as they have the greatest probability of a timing violation if no further action is taken. Each net or path may have a noise induced timing slack status that indicates whether it is in the positive timing slack region 402 or the negative timing slack region 404.

Figure 5:
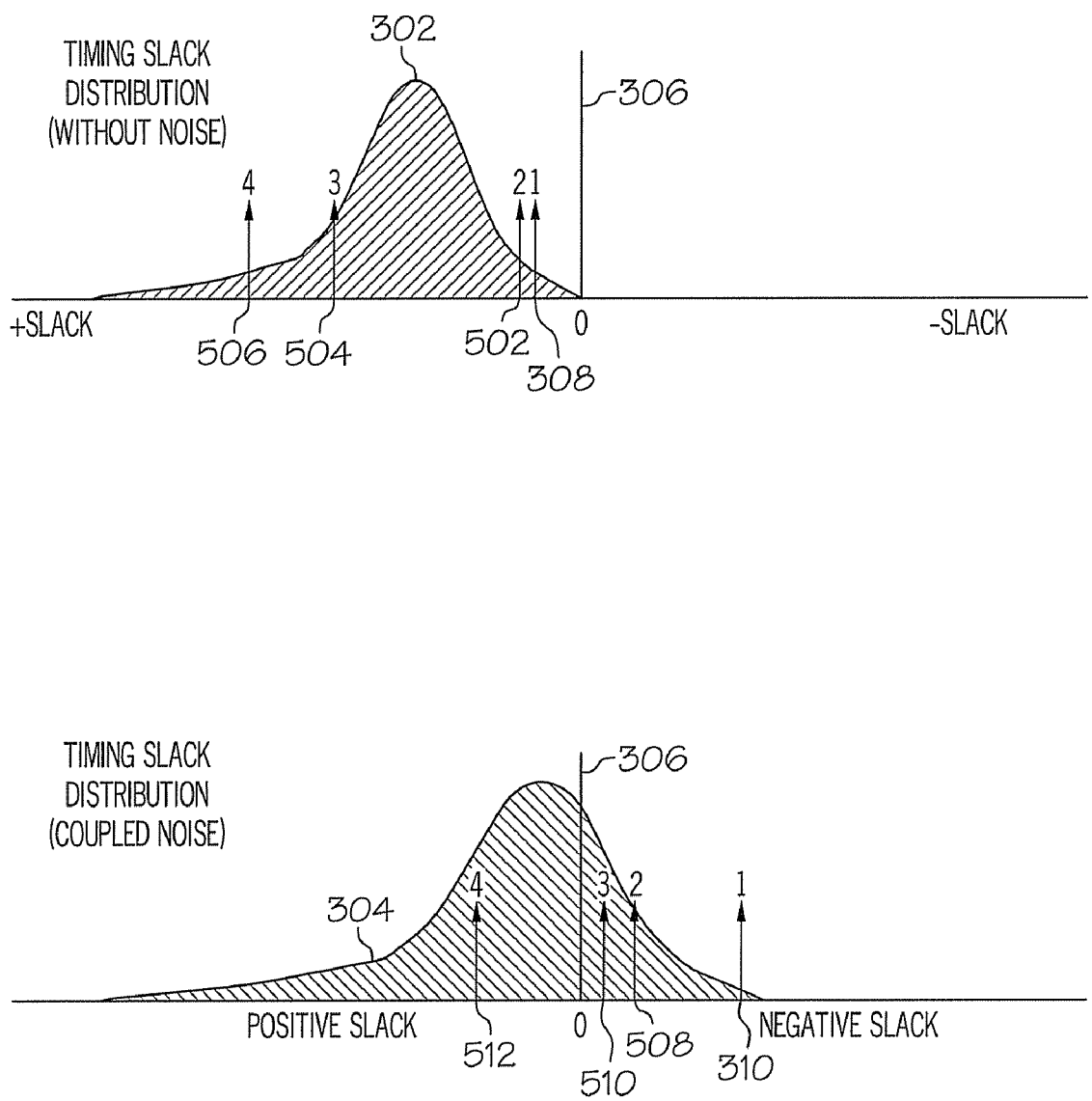
FIG. 5 depicts exemplary timing slack distributions for multiple paths, with and without coupled noise.

Turning now to FIG. 5, the timing slack distribution 302 and the coupled noise timing slack distribution 304 are depicted with the path one 308 and path one 310 respectively. While both timing slack distributions 302 and 304 represent the timing distributions for all paths within the given integrated circuit design, three additional paths have been highlighted for purposes of explanation. Path two 502, path three 504, and path four 506 are depicted in the timing slack distribution 302. Corresponding paths in the coupled noise timing slack distribution 304 include path two 508, path three 510, and path four 512. As previously discussed, each path can shift by a different amount relative to each path's particularized sensitivity to noise. For example, even though path two 502 is much closer to the timing slack threshold 306 than path three 504, both exhibit negative timing slack as paths two 508 and three 510. Path four 506 represents an example of a path that retains positive timing slack when coupled noise is introduced, as shown in path four 512, thus no additional measures are necessary to prevent timing violations for this path. FIG. 5 illustrates that each path or net in an integrated circuit design may require different levels of noise protection.

Figure 6:
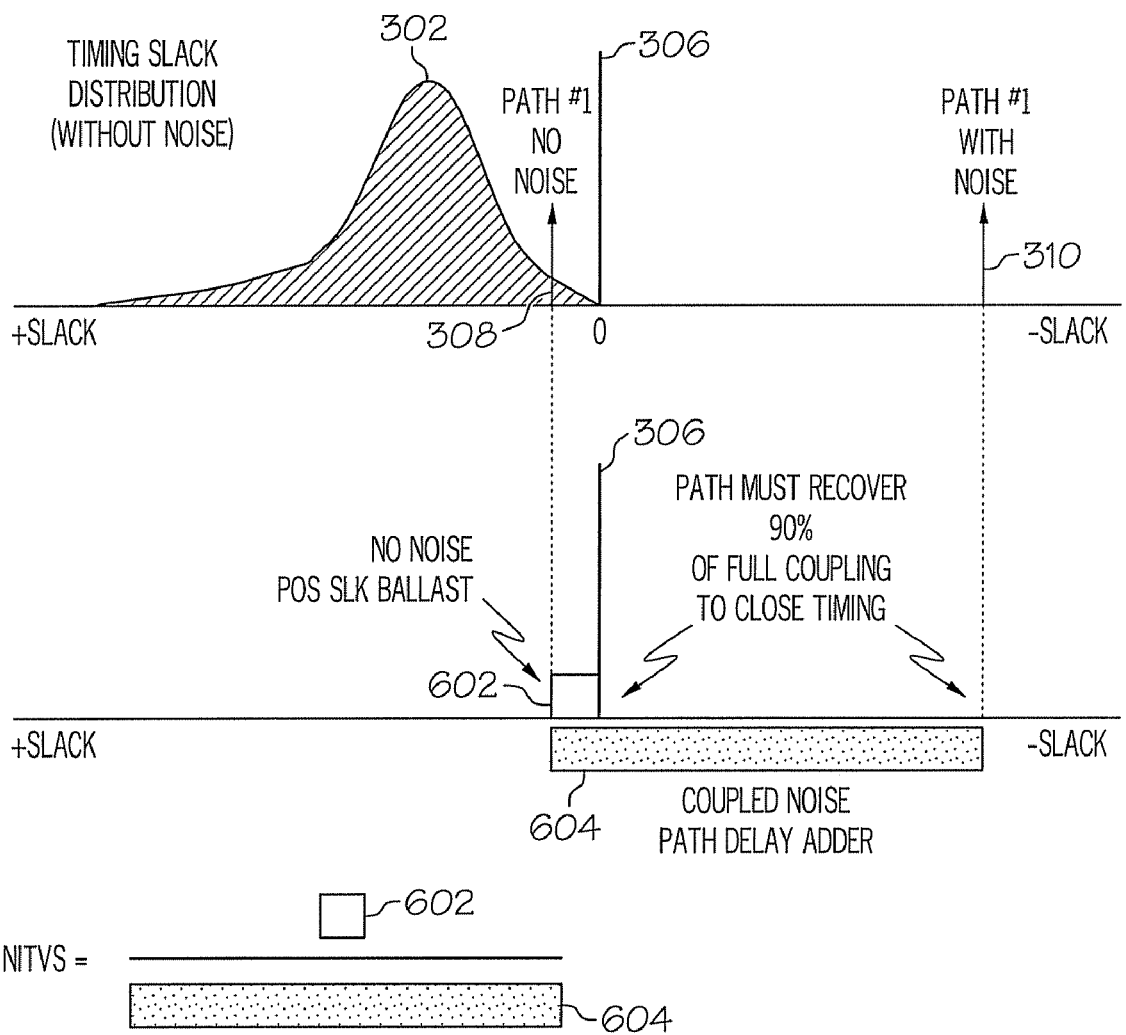
FIG. 6 depicts an exemplary effect of coupled noise on a first path, including a corresponding noise induced timing violation sensitivity metric.

In order to determine how much noise protection each net requires to avoid noise-induced timing violations on its timing paths, a metric can be calculated. In an exemplary embodiment, a noise induced timing violation sensitivity (NITVS) metric compares the time delay impact of coupled noise on a timing path to the time delay resource (no-noise positive slack amount), which can be consumed before incurring a timing violation. In effect this metric calculates the proportion of total coupling that can be tolerated before a timing violation is created. There are a number of ways to generate the NITVS metric. In an exemplary embodiment, the NITVS metric is calculated as the noise-free positive slack (i.e., no-noise positive slack ballast) divided by the amount of path delay adder caused by the predicted coupled noise for the path (i.e., coupled noise path delay adder). An exemplary NITVS metric calculation is graphically depicted in FIG. 6. No-noise positive slack ballast 602 represents the difference between the timing slack threshold 306 and path one 308, i.e. margin available to maintain timing. Coupled noise path delay adder 604 is the timing slack difference between the path one 310 (with noise) and the path one 308 (without noise). In an exemplary embodiment, the NITVS metric is calculated as the ratio of the no-noise positive slack ballast 602 divided by the coupled noise path delay adder 604. It will be understood by one skilled in the art that other equation forms are possible and applicable within the scope of the invention. The exemplary NITVS calculation depicted in FIG. 6 provides moderate range sensitivity, roughly approximating the percentage of coupled delay adder that can be tolerated without violating path one's timing target.

The NITVS metric need not be absolutely accurate, only relatively accurate, as the NITVS metric is used to prioritize nets in terms of their tendency to violate timing for imposed conditions of noise coupling. For single net paths, the net is the path, i.e. a single point-to-point connection. Thus nets/paths with different amounts of pre-coupling positive timing slack have their available timing slack compared to their noise-induced path delay adder. This comparative violation sensitivity relationship dictates the degree of isolation required, and the consequent isolation constraint and routing priority assigned to each net/path.

For example, path one 308 has a small no-noise positive slack ballast 602, indicating that it can absorb only a small coupled noise path delay adder without violating its timing target at the timing slack threshold 306. However, in an exemplary embodiment, a coupled noise timing analysis via the TAT 114 of FIG. 1 reveals a large coupled noise path delay adder 604 due to noise. As a result, most of the potential path delay adder due to noise must be prevented in order to avoid a timing violation for this path. To achieve the desired level of noise prevention, this path/net must be isolated for most of its coupling length. Thus this path/net receives a high degree of isolation constraint and a high priority for routing.

Figure 7:
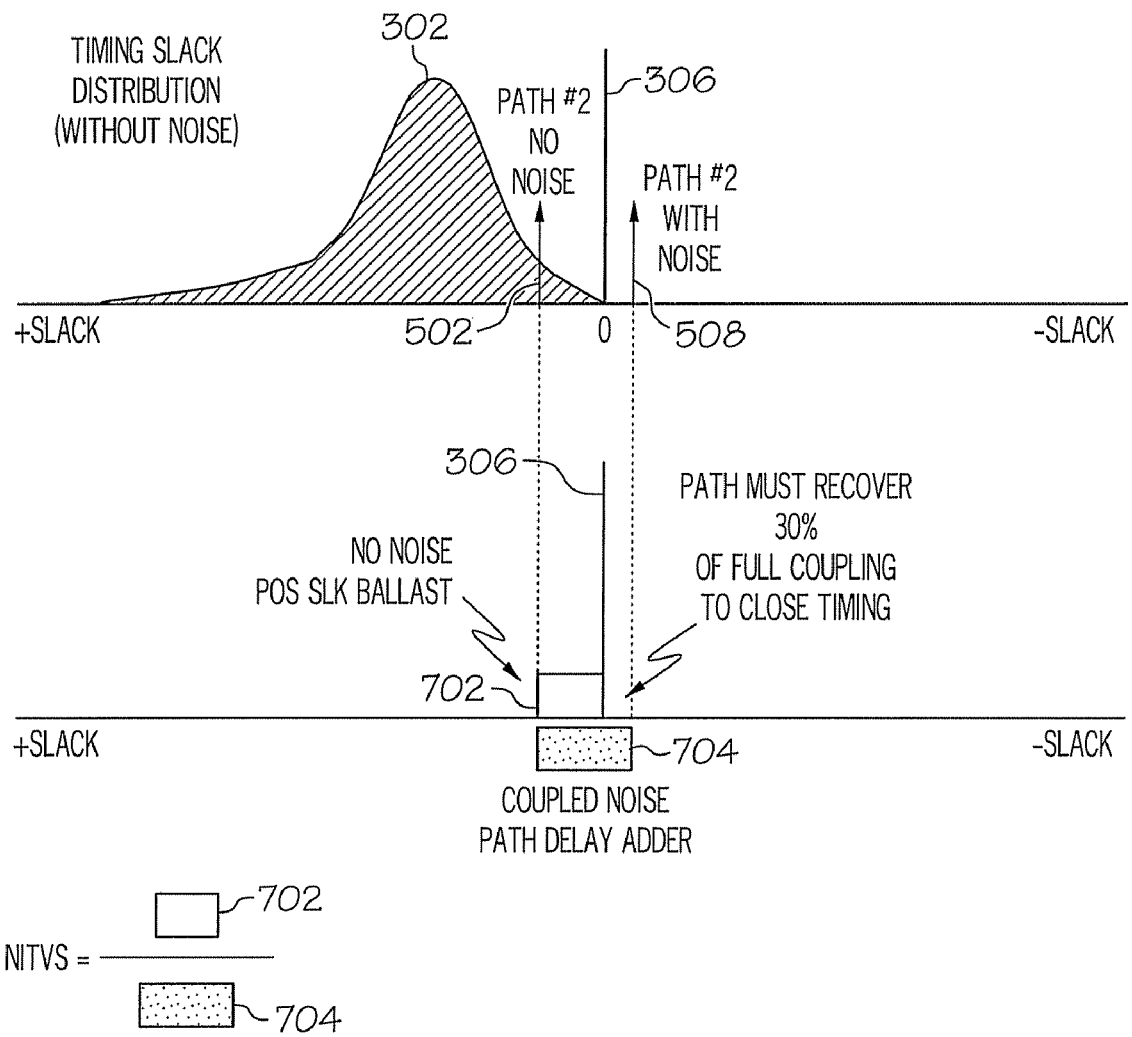
FIG. 7 depicts an exemplary effect of coupled noise on a second path, including a corresponding noise induced timing violation sensitivity metric.

Turning now to FIG. 7, a graphical depiction of the calculation of an NITVS metric for path two is provided. No-noise positive slack ballast 702 represents the difference between the timing slack threshold 306 and path two 502, i.e. margin available to maintain timing. Coupled noise path delay adder 704 is the timing slack difference between the path two 508 (with noise) and the path two 502 (without noise). In an exemplary embodiment, the NITVS metric is calculated as the ratio of no-noise positive slack ballast 702 divided by the coupled noise path delay adder 704. The no-noise positive slack ballast 702 for path two is slightly larger than the no-noise positive slack ballast 602 of FIG. 6 for path one. Thus for a given amount of coupled noise, path two is a bit less susceptible to a timing violation than path one. More importantly, in an exemplary embodiment, a coupled noise timing analysis via the TAT 114 of FIG. 1 indicates that the coupled noise path delay adder 704 for path two is much less than the coupled noise path delay adder 604 of FIG. 6 for path one. Consequently, only a small portion of the path/net must be isolated in order to prevent a timing violation due to noise. As a result, the path two of FIG. 7 receives a lower degree of isolation constraint and a lower priority for routing than path one of FIG. 6.

Figure 8:
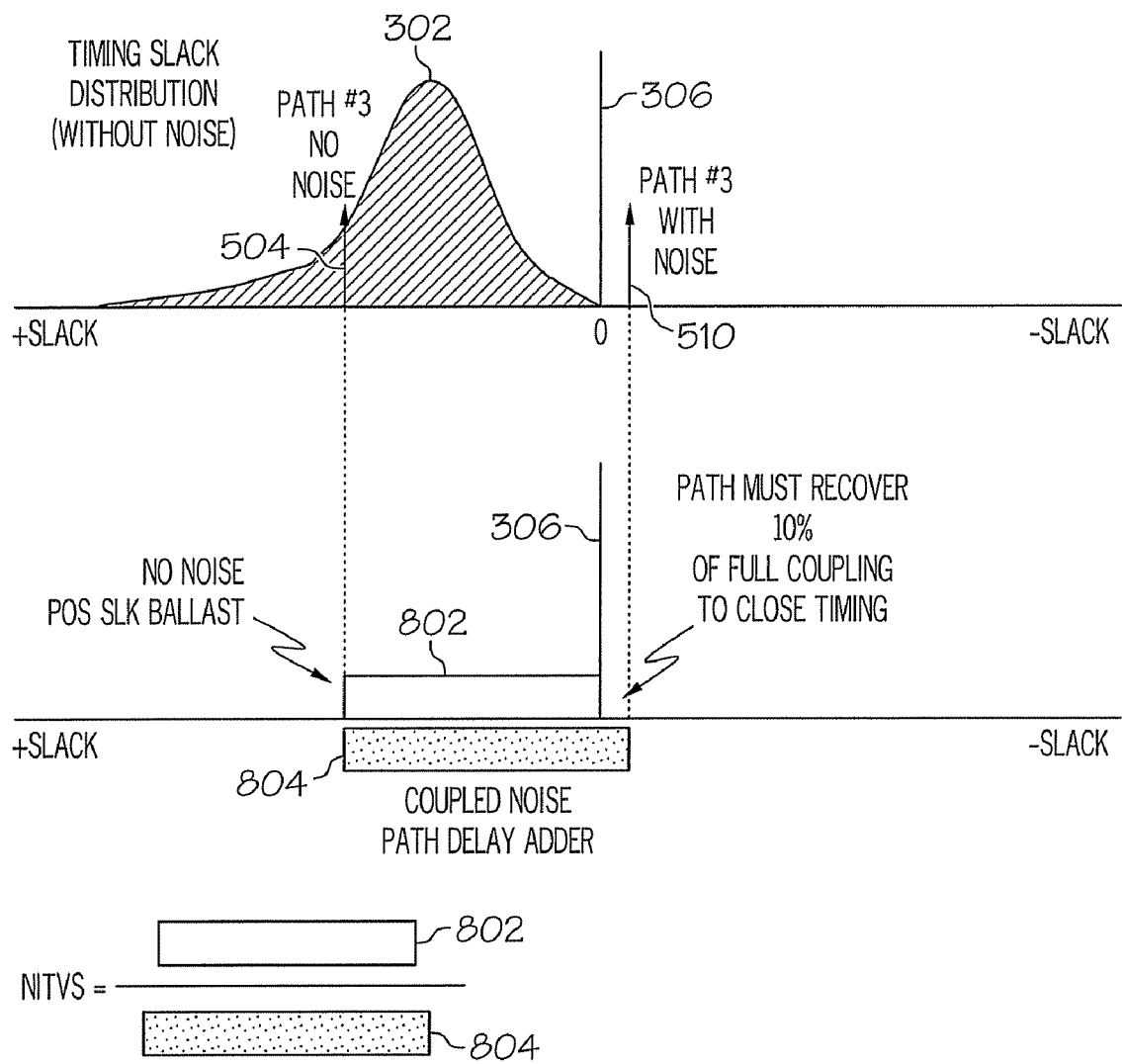
FIG. 8 depicts an exemplary effect of coupled noise on a third path, including a corresponding noise induced timing violation sensitivity metric.

Turning now to FIG. 8, a graphical depiction of the calculation of an NITVS metric for path three is provided. No-noise positive slack ballast 802 represents the difference between the timing slack threshold 306 and the path three 504, i.e. margin available to maintain timing. Coupled noise path delay adder 804 is the timing slack difference between the path three 510 (with noise) and the path three 504 (without noise). In an exemplary embodiment, the NITVS metric is calculated as the ratio of no-noise positive slack ballast 802 divided by the coupled noise path delay adder 804. The no-noise positive slack ballast 802 for path three is much larger than the no-noise positive slack ballasts 602 and 702 of FIGS. 6 and 7 for paths one and two. Thus for a given amount of coupled noise, path three is less susceptible to a timing violation. However, in an exemplary embodiment, a coupled noise timing analysis via the TAT 114 of FIG. 1 indicates that the coupled noise path delay adder 804 for path three is much greater than the coupled noise path delay adder 704 of FIG. 7 for path two. But because of the large no-noise positive slack ballast 802 available for consumption by noise, only a small portion of the path/net must be isolated in order to prevent timing violation due to noise. Thus, similar to path two of FIG. 7, path three of FIG. 8 also receives a lower degree of isolation constraint and a lower priority for routing than path 1 of FIG. 6.

Figure 9:
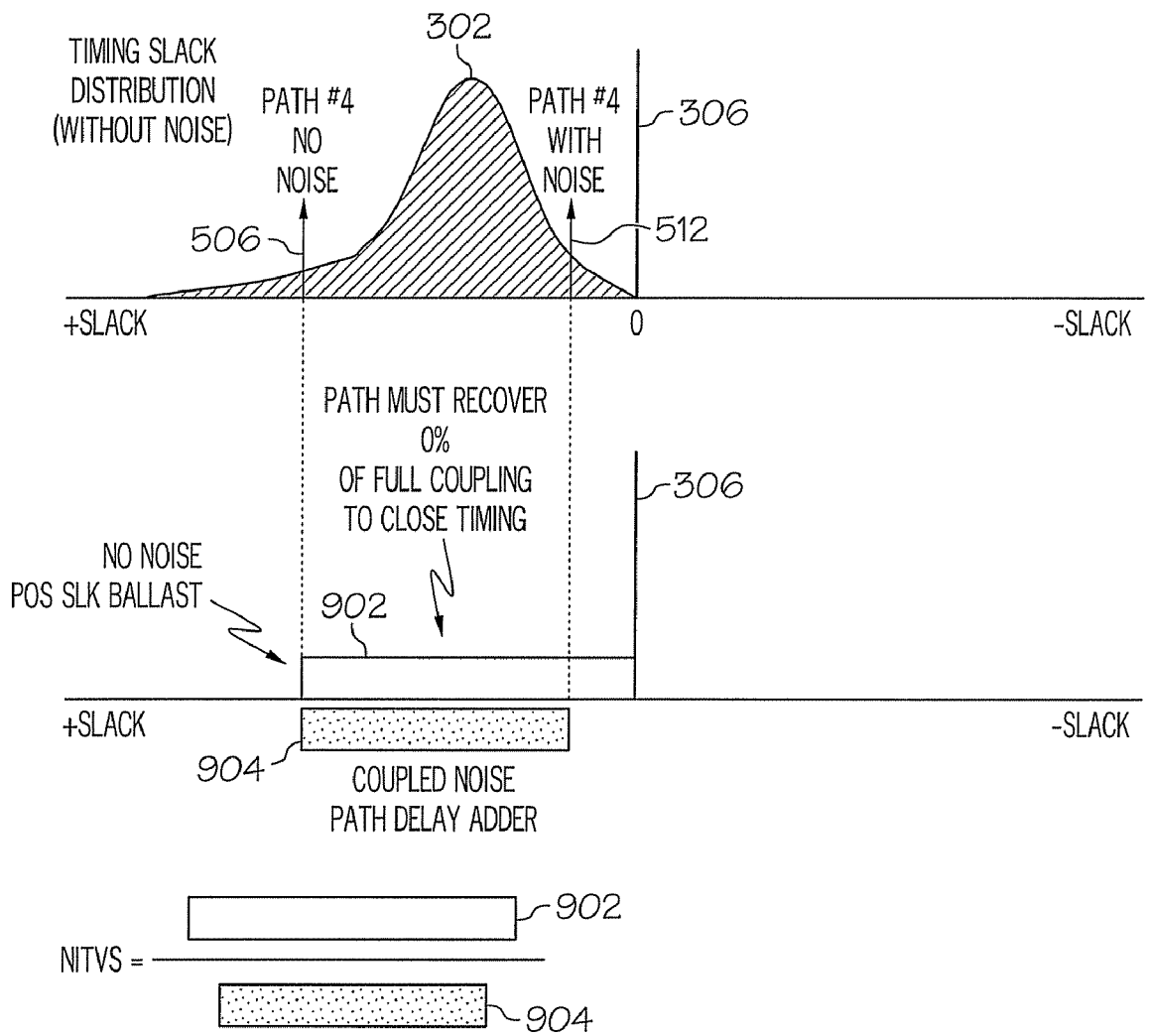
FIG. 9 depicts an exemplary effect of coupled noise on a forth path, including a corresponding noise induced timing violation sensitivity metric.

Turning now to FIG. 9, a graphical depiction of the calculation of an NITVS metric for path four is provided. No-noise positive slack ballast 902 represents the difference between the timing slack threshold 306 and the path four 506, i.e. margin available to maintain timing. Coupled noise path delay adder 904 is the timing slack difference between the path four 512 (with noise) and the path four 506 (without noise). In an exemplary embodiment, the NITVS metric is calculated as the ratio of no-noise positive slack ballast 902 divided by the coupled noise path delay adder 904. Path four has the largest no-noise positive slack ballast 902 of all the exemplary paths one through four of FIGS. 6-9. Path four is the most noise immune, and is less susceptible to a timing violation than any of the other paths previously described. In an exemplary embodiment, a coupled noise timing analysis via the TAT 114 of FIG. 1 indicates that the coupled noise path delay adder 904 is significant, but because of the large no-noise positive slack ballast 902 available for consumption by noise, it does not result in a projected timing violation. As a result, this path/net can be fully noise coupled without a timing violation risk. This path/net requires no isolation from coupling, receiving the least degree of isolation constraint and a lowest priority for routing.

Figure 10:
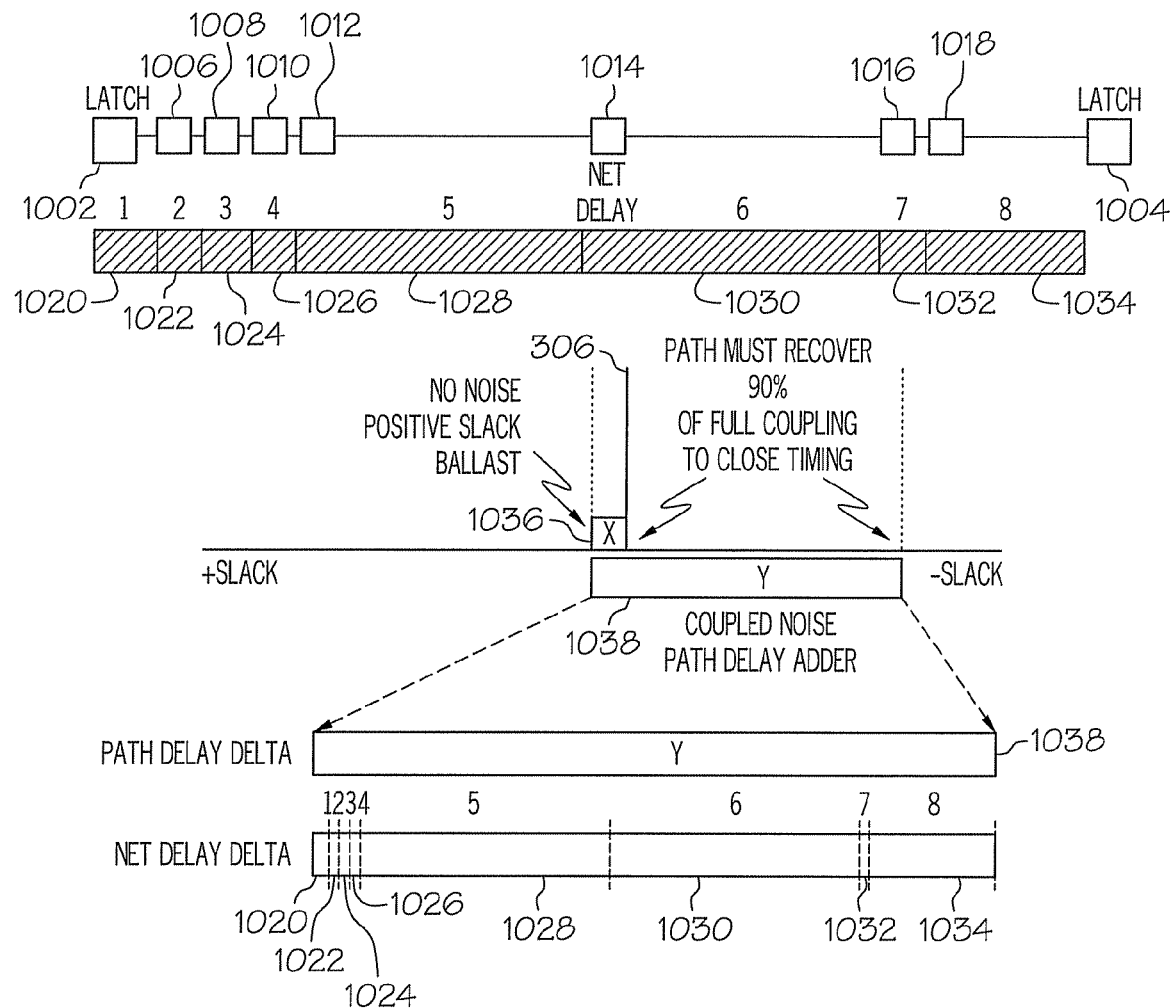
FIG. 10 depicts an exemplary effect of coupled noise on a first path of a multi-net path, including a corresponding noise induced timing violation sensitivity metric.

Because of the way in which parasitic noise effects are modeled and path delay adders are calculated, both single net paths and multi-net paths can be handled in a similar manner. As previously discussed, for a single net path, the net is the path. Thus, NITVS metric calculations as described in reference to FIGS. 6-9 may be performed for all single net paths in an integrated circuit design. However, some paths within an integrated circuit design can each contain multiple nets, also referred to as multi-net paths. A multi-net path is defined as a series of net connections and intermediary circuit nodes between two end points, for example, latches. In an exemplary embodiment, a noise-induced path delay adder is apportioned among the nets in a multi-net path. Each timing path's delay can be visualized as a summation of net and circuit delays, as depicted in FIG. 10. In the example depicted in FIG. 10, a multi-net path spans between latches 1002 and 1004. Each net is defined as a connection between nodes. For example, a first net exists between the latch 1002 and intermediary circuit node 1006. Similarly, nets 2-7 exist between each intermediary circuit node 1006-1018. An eighth net exists between the intermediary circuit node 1018 and the latch 1004. The delays between each net and the intermediary circuit nodes 1006-1018, as well as the latch 1002, account for the total path delay from the latch 1002 to the latch 1004, referred to as a path delay delta 1038. Each of the delays can be individually analyzed on a net-by-net basis to further control routing priority on each net within the path, referred to as net delay deltas 1020-1034.

The example depicted in FIG. 10 is equivalent to a multi-net version of the path one, as previously described in reference to FIG. 6. Accordingly, no-noise positive slack ballast 1036 is equivalent to the no-noise positive slack ballast 602 of FIG. 6, and path delay delta 1038 is equivalent to the coupled noise path delay adder 604 of FIG. 6. The path delay delta 1038 represents the coupled noise path delay as the summation of the individual net delay deltas 1020-1034 in the multi-net path one of FIG. 10.

Figure 11:
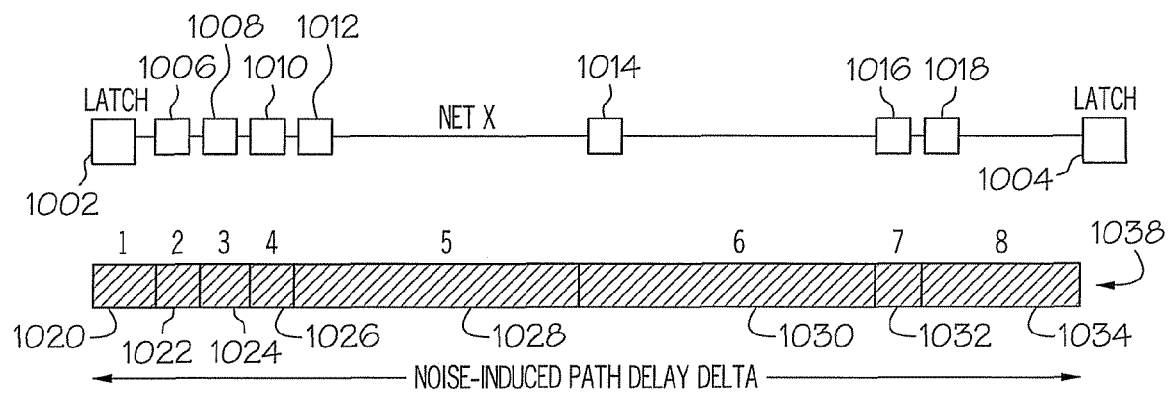
FIG. 11 depicts an exemplary noise-induced path delay delta and a net delay delta apportionment for a multi-net path.
Figure 11:
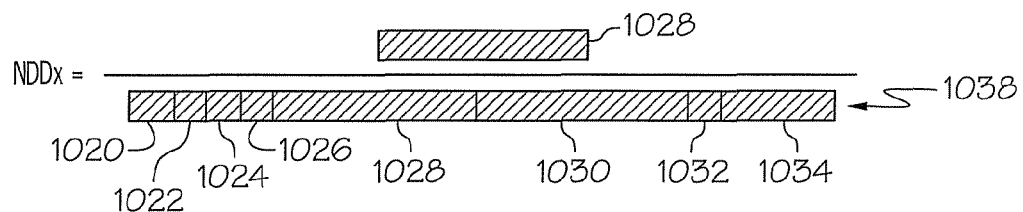

Turning now to FIG. 11, the multi-net path one of FIG. 10 is depicted, including the latches 1002 and 1004, in addition to the nets linking the intermediary circuit nodes 1006-1018 within the multi-net path one. The relative effect of each of the net delay deltas 1020-1034 for the path delay delta 1038 can be calculated as a ratio, referred to as a net delay delta apportionment. The net delay delta apportionment calculation allocates the path delay among constituent nets, assigning noise responsibility among the nets without creating modeling overlap or redundancy. An example of a net delay delta apportionment calculation is graphically depicted in FIG. 11 for net 5, as the net delay delta 1028 divided by the path delay delta 1038. There is a small conservatism and priority overemphasis caused by this technique when large transition times propagate their effects on circuit delay responses through multiple stages, which can exaggerate priority for some nets in some paths. Priority amplification may occur on a minimal percentage of a design's nets and should negligibly impact wire-ability of the integrated circuit design.

Since nets may vary greatly in length, their timing segment (circuit plus net) noise contribution to the path delay can vary greatly as well. Very small nets contribute negligibly to the noise-induced path delay adder, even if the nets are fully noise coupled. Large nets have the capacity to impact timing significantly, and medium length net impacts lie somewhere in between. Apportioning the path delay may be performed through calculating the percentage contribution of noise-induced net delay to the noise-induced path delay as follows.

Net Delay Delta=NDD

NDD=% noise contribution=(noise induced net delay delta)/(noise-induced path delay delta).

Thus, the original NITVS metric can be modified so that it is applicable for both single net and multi-net paths.

NITVS'=NITVS(original)/NDD

NITVS'=[(No noise timing path slack)/(noise-induced path delta delay)]/[(noise induced net delay delta)/(noise-induced path delay delta)] or NITVS'=[(No noise timing path slack)/(noise-induced path delta delay)]×[(noise-induced path delay delta)/(noise induced net delay delta)]

After canceling terms, the result is: NITVS'=(No noise timing path slack)/(noise induced net delay delta).

For single net paths, the noise induced net delay delta is equal to the noise-induced path delay delta. As a result, the NITVS equation reduces to the original NITVS equation, as illustrated in the following sequence.

NITVS'=(No noise timing path slack)/(noise induced net delay delta)

NITVS'=(No noise timing path slack)/(noise induced path delay delta)

NITVS'=NITVS(original)

For multi-net paths, NITVS'=no noise slack/net delay delta.

Figure 12:
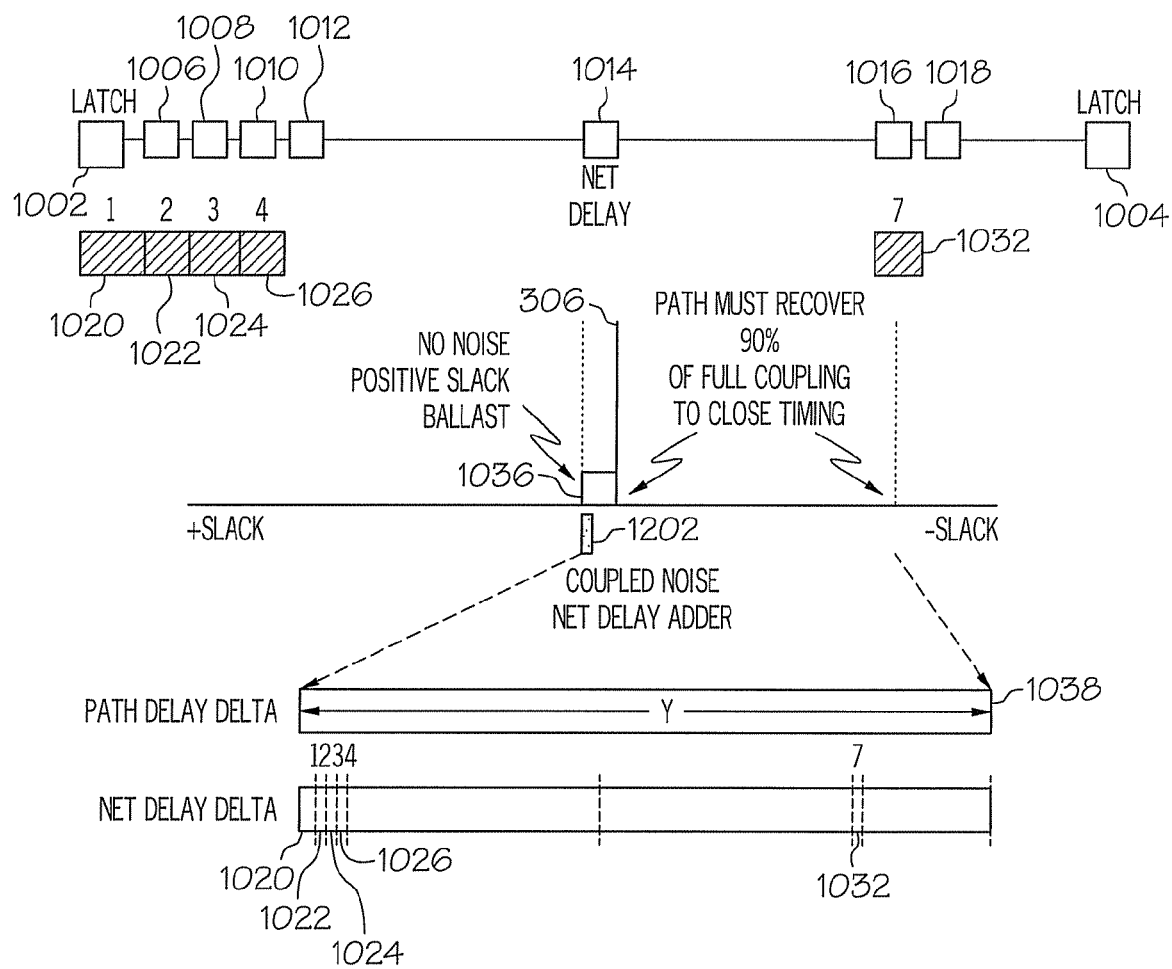
FIG. 12 depicts small delay contributors for an exemplary noise-induced path delay delta on a multi-net path.
Figure 13:
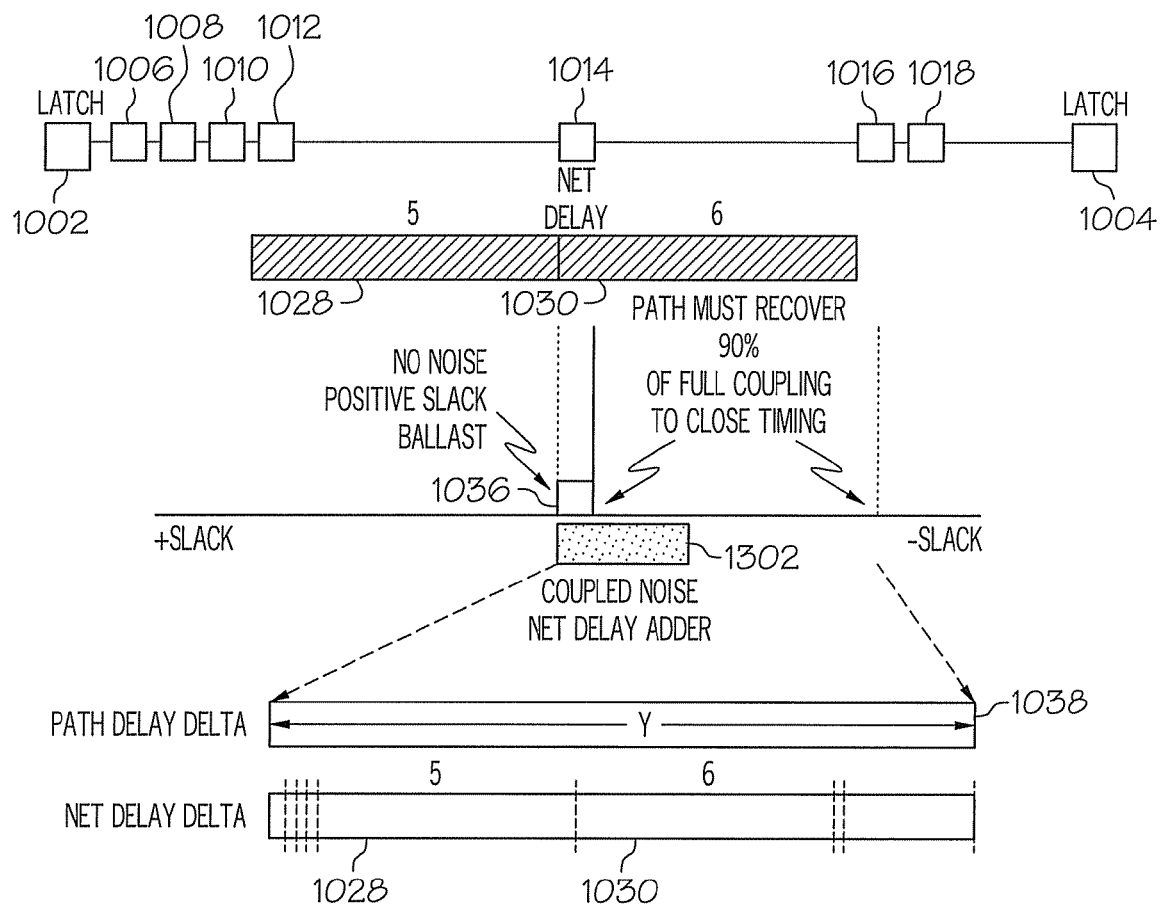
FIG. 13 depicts large delay contributors for an exemplary noise-induced path delay delta on a multi-net path.
Figure 14:
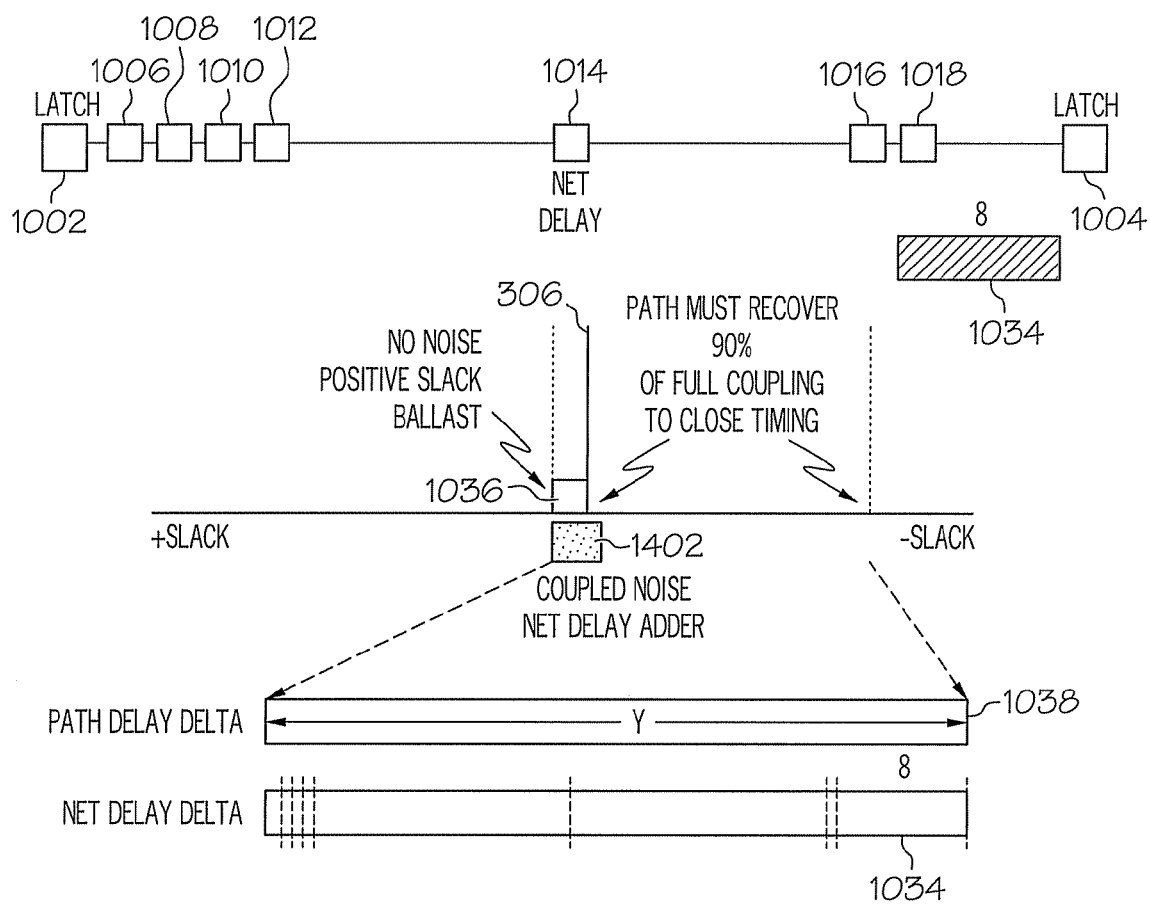
FIG. 14 depicts a medium delay contributor for an exemplary noise-induced path delay delta on a multi-net path.

This approach accounts for net length contributions to the path delay delta. Small nets with very small noise contribution elevate the NITVS value and lower their routing priority. Longer nets with significant contributions to the path delay delta have lower NITVS values than the small nets, resulting in a higher routing priority. FIGS. 12, 13, and 14 illustrate the relative contribution for small net delay deltas 1020, 1022, 1024, 1026, and 1032, large net delay deltas 1028 and 1030, and a medium net delay delta 1034 respectively. The net delay deltas 1020-1034 as grouped are illustrated as coupled noise net delay adders 1202 of FIG. 12, 1302 of FIG. 13, and 1402 of FIG. 14, which collectively add up to the path delta delay 1038. The examples depicted in FIG. 6 for the single net path one and FIGS. 10-15 for the multi-net path one, as previously described, are expressed in generic terms through the following set of exemplary equations.

Let a given no noise slack value=X.

Let a given noise-induced path delay delta=Y.

For a single net path the NITVS' value: $NITVS_{single} = X/Y$.

Let another path have the same no noise slack value=X and the same noise-induced path delay delta=Y. But let this path be composed of 8 nets with the following characteristics: Nets 1, 2, 3, 4, and 7 are short nets, and their accumulated noise induced net delay deltas 1020, 1022, 1024, 206, and 1032 are all equal to 0.01Y (coupled noise net delay adder 1202), as depicted in FIG. 12. Nets 5 and 6 are long nets, and their accumulated noise induced net delay deltas 1028 and 1030 are equal to 0.40Y (coupled noise net delay adder 1302), as depicted in FIG. 13. Net 8 is a moderate size net noise induced net delay delta 1034 equal to 0.15Y (coupled noise net delay adder 1402), as depicted in FIG. 14.

Figure 15:
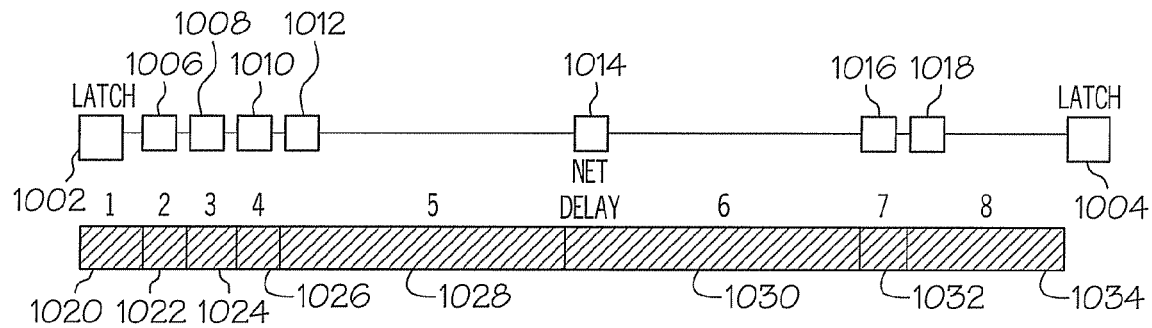
FIG. 15 depicts a comparison and relative priority for different contributors to delays.

The NITVS values for the example are calculated as follows, as depicted in FIG. 15:

For nets 1,2,3,4,7: $NITVS' = X/0.01Y = 100\ X/Y$.

For nets 5,6: $NITVS' = X/0.4Y = 2.5\ X/Y$.

For net 8: $NITVS' = X/0.15Y = 6.6\ X/Y$.

As previously described, nets with the lowest NITVS values receive the highest priority for routing isolation. In this simple case of two paths, a single net path and a multi-net path with the same no-noise to noise induced path delay adder ratio (X/Y), the following wiring isolation priorities are determined, as listed in table 1. The single net path with a no-noise to noise induced path delay adder ratio of X/Y has the lowest NITVS value, and hence the highest isolation priority compared to a multi-net path. In an exemplary embodiment, different nets and paths have different X/Y ratio values, resulting in different relative wiring isolation priorities.

TABLE 1

Exemplary NITVS and Isolation Priorities

| Net Type | NITVS' Value | Relative NITVS Value | Isolation Priority |
|---|---|---|---|
| Single Net Path | X/Y | 1.0 | 1 |
| Multi-net Path Short Nets (1, 2, 3, 4, 7) | 100 X/Y | 100 | 4 |
| Multi-net Path Medium Net (8) | 6.6 X/Y | 6.6 | 3 |
| Multi-net Path Long Nets (5, 6) | 2.5 X/Y | 2.5 | 2 |

Figure 16A:
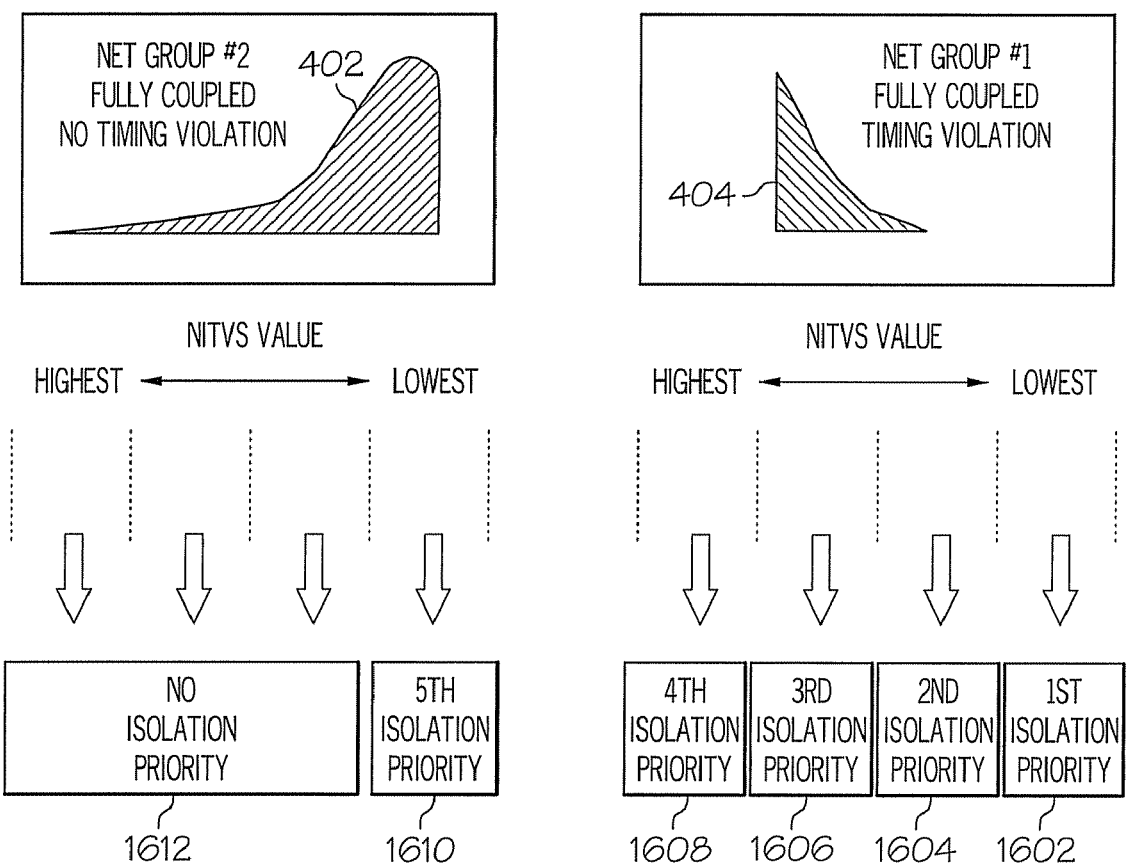
FIGS. 16A and B depict a noise induced timing violation sensitivity to noise avoidance priority conversion.
Figure 16B:
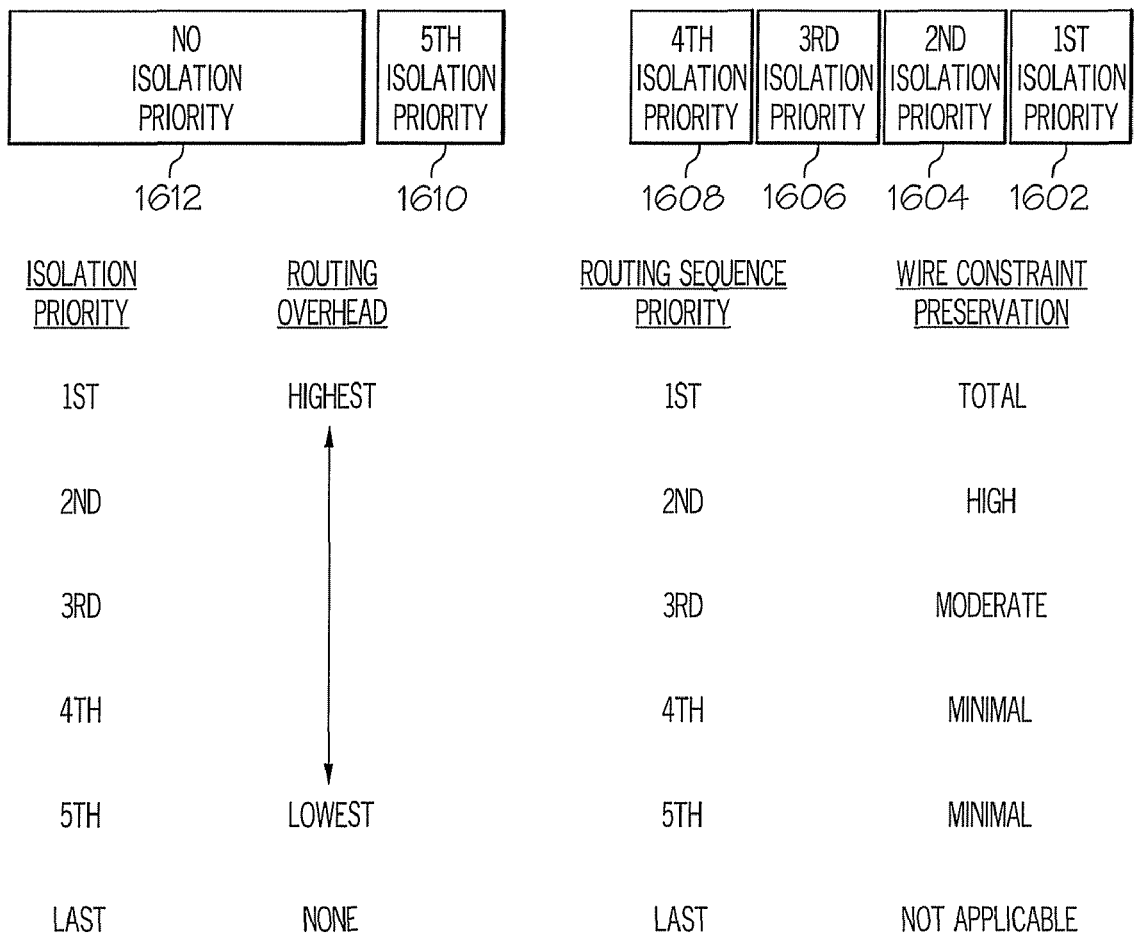

Turning now to FIGS. 16A and 16B, an NITVS to noise avoidance priority is depicted. In an exemplary embodiment, prioritization for isolation is assigned not only on an NITVS value, but also with respect to a net group for a timing slack region, such that nets within the negative timing slack region 404 have priority over the nets in the positive timing slack region 402. Using a timing slack status value, each net can be identified as located within the positive timing slack region 402 or the negative timing slack region 404. In the example depict in FIG. 16A, nets with the lowest NITVS value in the negative timing slack region 404 are assigned to first isolation priority 1602, representing nets requiring the greatest level of isolation. Additional priority groups are assigned for nets with progressively higher NITVS values, forming a second isolation priority 1604, a third isolation priority 1606, and a fourth isolation priority 1608. In the positive timing slack region 402, a fifth isolation priority 1610 is assigned to nets with the lowest NITVS value, and the remaining nets are assigned no isolation priority 1612. Assigning at least one isolation priority for nets in the positive timing slack region 402 may provide partial isolation for nets that are close to crossing into the negative timing slack region 404. While only six isolation priorities 1602-1612 are depicted in FIGS. 16A and B, it will be understood that any number of isolation priorities can be created and assigned within the scope of the invention.

In an exemplary embodiment, creating relative priorities for isolation is performed in two parts. An initial filter is each path's timing slack after coupled noise effects on timing are accounted for. Path timing slack separates the nets into two categories, nets with positive timing slack with noise, and nets with negative timing slack with noise. A second filter prioritizes the nets within each category created by the first filter. This prioritization within a category is based on the relative NITVS value of each net compared to other nets within its category.

In an exemplary embodiment, the status of noise-induced path timing slack is the first arbiter of how much isolation is required for a net. If a path with a fully coupled noise model has a timing slack that remains positive, full coupling of each net in the path can be absorbed without causing a timing violation. These nets have the lowest priority for isolated routing.

All of the nets with positive timing slack with noise have NITVS values greater than one. The nets in the positive timing slack region 402 can be prioritized within the positive timing slack region 402 based on their NITVS values. The lower the NITVS value, the higher the priority within the positive timing slack region 402.

In an exemplary embodiment, the nets in the negative timing slack region 404 have a higher priority for isolation than the nets in the positive timing slack region 402. The negative timing slack nets are prioritized among themselves based on NITVS values. The lower the NITVS value, the higher the priority for isolation. The NITVS values for negative timing slack nets can range from just above zero to a maximum value greater than one.

In an exemplary embodiment, nets are prioritized for isolation based on timing slack status (positive or negative timing slack region categorization) and NITVS values. The nets are sorted separately within each region or category from lowest NITVS value to highest NITVS value. Nets with the lowest NITVS value receive the highest priority for isolation and for routing sequence preference, as depicted in FIG. 16B.

In an exemplary embodiment, isolation sequence and routing priorities are assigned based upon each path and/or net assignment to either the positive timing slack region 402 or the negative timing slack region 404. All nets in the positive timing slack region 402 may be given the lowest priority for isolation protection and the lowest priority for routing sequence. Nets corresponding to the negative timing slack region 404 may be partitioned into several sub-groups based on their NITVS value. Nets within a specified range of the smallest NITVS values are given the highest priority for coupling protection and first preference for routing sequence. Nets within higher NITVS value ranges may be partitioned into additional sub-groups and are given correspondingly lower priority for coupling protection and routing equivalence.

Routing strategies can be created and categorized on the basis of how much coupling potential versus routing freedom they allow. Exemplary routing strategies in order of decreased coupling protection (noise avoidance) and increased routing freedom include: shielded wire codes, double isolate wire codes, single isolate wire codes, wiretype set (preferred isolate), and normal wirecodes. The most robust noise avoidance strategy employs shielded wire codes, which offer almost complete noise immunity. This strategy guarantees negligible noise coupling, but consumes a great deal of track resources, at the expense of degrading routing freedom of other nets that follow in the routing sequence. Shielding may employ a constant current wire on either side of the shielded wire to minimize coupling risk, for example a ground or a constant current voltage. Isolate wires offer significant noise immunity with a reduced consumption of track resources. As a result, routing freedom for subsequent nets is increased. Isolate wires may be routed at a greater distance from other wires to maintain separation, decreasing the risk of coupling. The use of wiretype sets with preferred isolate wire usage and auxiliary single wide wire usage for access in congested areas, preserves much of the noise immunity of the isolate wires while allowing more routing freedom and a higher probability of routing success in congested areas. Normal wire codes have the least inherent noise immunity, but consume the least amount of track resources and allow for the greatest routing freedom.

The noise immunity characteristics of routing strategies can be mated up with the corresponding noise immunity requirements of the NITVS prioritized nets. In an exemplary embodiment, each net is prioritized based on the value of its sensitivity to noise induced timing violations. Nets with the smallest percentage of allowed coupling receive the highest routing constraint priority as listed in the exemplary isolation constraint table 2. Each of the NITVS percentage values may be determined analytically as a percentage of a range or assigned a fixed value. For example, the "lowest" NITVS percentage could represent nets in the negative timing slack region with an NITVS of 0.25 (25%) or less.

TABLE 2

Exemplary Isolation Constraints

| NITVS % | Isolation Constraint |
| --- | --- |
| Lowest | Highest |
| Low | Moderately high |
| Medium | Partial |
| High | Low |
| Highest | None |

It will be understood that many NITVS versus routing strategy associations can be devised. For example, the routing strategies provided in table 3 represent one possible set of routing strategies. Once routing strategies are determined, they may be applied by the ICRT 116 of FIG. 1 in a priority sequence to attempt more restrictive routing before least restrictive routing. In an exemplary embodiment, the ICRT 116 of FIG. 1 outputs results to the output files 112 for FIG. 1. The output files 112 for FIG. 1 can include routing priority and sequence information. Actual detailed routing applying routing priority and sequence information may be performed by the ICRT 116 of FIG. 1 or another application (not depicted).

TABLE 3

Exemplary Routing Strategies

| NITVS % | Routing Strategy |
| --- | --- |
| Lowest | Use shielded or double isolated wires |
| Low | Use isolated wires |
| Medium | Use isolated or normal wires |
| High | Use normal wires with spreading pass |
| Highest | Use normal wires with non-spreading pass |

Figure 17:
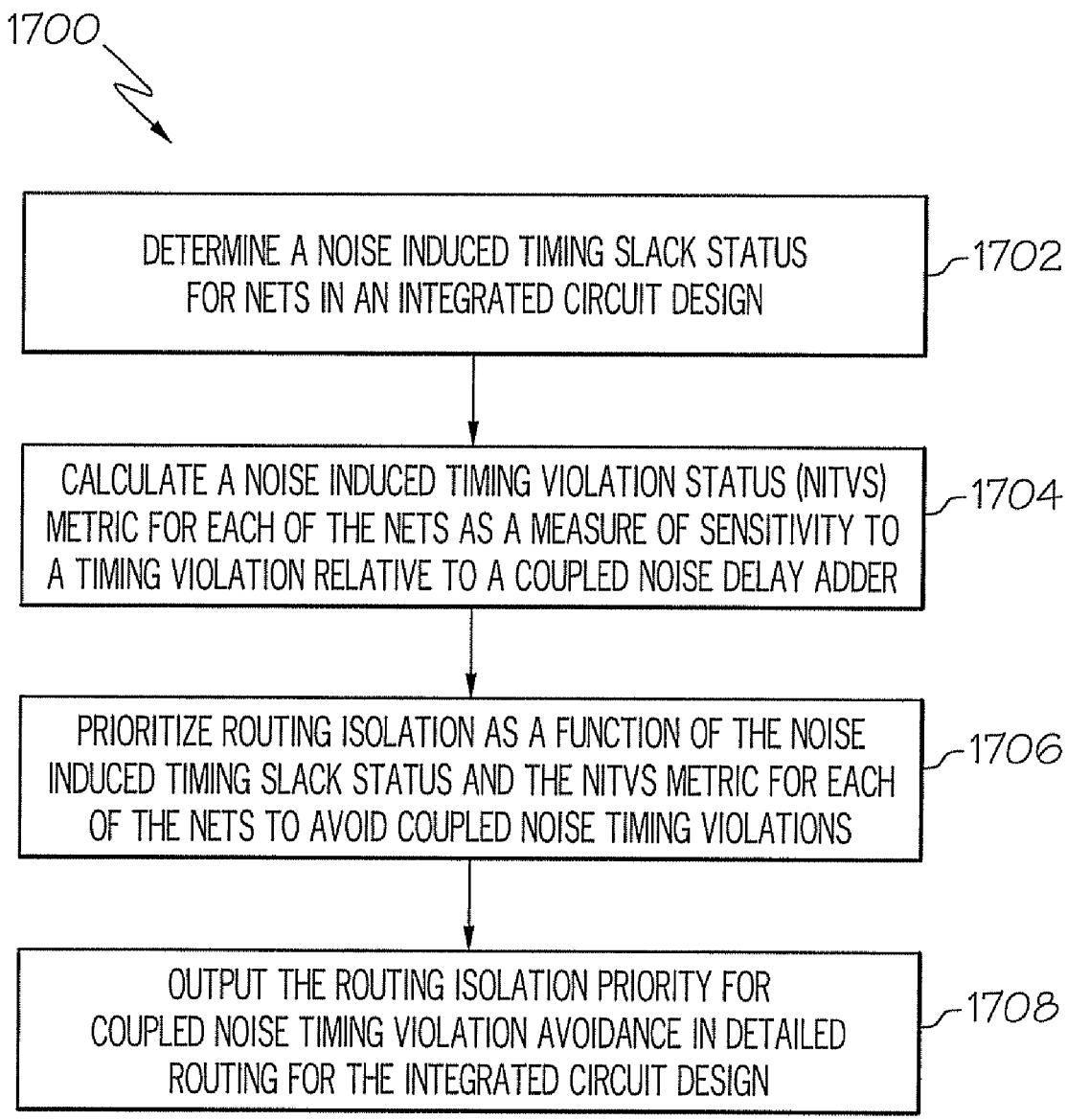
FIG. 17 depicts an exemplary process flow for coupled noise timing violation avoidance in detailed routing.

Turning now to FIG. 17, a process 1700 for coupled noise timing violation avoidance in detailed routing for an integrated circuit design will now be described in accordance with an exemplary embodiment in reference to the system 100 of FIG. 1. In an exemplary embodiment, the host system 102 executes the ICRT 116 to perform coupled noise timing violation avoidance in detailed routing for an integrated circuit design. The hosts system 102 may also execute the TAT 114. The TAT 114 determines a timing slack distribution without noise for the nets, and applies a noise model, such as the noise model 220 of FIG. 2C, to the nets to produce a coupled noise timing slack distribution. In an exemplary embodiment, design information for the integrated circuit design is stored in the design data 110. The integrated circuit design may include single net paths, multi-net paths, or a combination thereof. The process 1700 can apply to both single net paths and multi-net paths, including subgroups of nets within multi-net paths. At block 1702, the ICRT 116 determines a noise induced timing slack status for nets in the integrated circuit design. In an exemplary embodiment, the noise induced timing slack status assigns each of the nets to one of a positive timing slack region and a negative timing slack region.

At block 1704, the ICRT 116 calculates an NITVS metric for each of the nets as a measure of sensitivity to a timing violation relative to a coupled noise delay adder. The ICRT 116 may receive a timing slack distribution without noise for the nets and a coupled noise timing slack distribution for the nets from the TAT 114. The ICRT 116 can calculate the coupled noise delay adder as a difference in timing slack between the coupled noise timing slack distribution and the timing slack distribution without noise for each of the nets. The coupled noise delay adder may be determined based on a path, a net, or a subgroup of nets. For example, the NITVS metric for a single net path can be calculated as a ratio of a no-noise positive slack ballast to a coupled noise path delay adder, as depicted in FIGS. 6-9. Alternatively, for one or more nets in a multi-net path, the NITVS metric may be calculated as a ratio of a no-noise positive slack ballast to a summation of one or more net delay deltas for the one or more nets, where the summation of all net delay deltas in the multi-net path is equivalent to a coupled noise path delay adder for the multi-net path, as depicted in FIGS. 12-15. The no-noise positive slack ballast represents the timing margin available for a given net or path without noise.

At block 1706, the ICRT 116 prioritizes routing isolation as a function of the noise induced timing slack status and the NITVS metric for each of the nets to avoid coupled noise timing violations. In an exemplary embodiment, prioritizing the routing isolation assigns the highest routing isolation priority to one or more nets with a lowest NITVS metric in the negative timing slack region. Prioritizing the routing isolation may also assign the lowest routing isolation priority to one or more nets with a highest NITVS metric in the positive timing slack region. In an exemplary embodiment, all nets or paths in the negative timing slack region 404 have a higher priority than the nets or paths in the positive timing slack region 402, as depicted in FIGS. 16A and B.

At block 1708, the ICRT 116 outputs the routing isolation priority for coupled noise timing violation avoidance in detailed routing for the integrated circuit design. The output may be formatted as a file or data for storage in the data storage device 108, such as the output files 112. The ICRT 116 may also determine a set of routing strategies characterized by varying strength of routing constraints, and correlate the set of routing strategies to the routing isolation priorities. In an exemplary embodiment, the ICRT 116 applies a most constrained routing strategy in the set of routing strategies to a highest routing isolation priority, and applies the remaining routing strategies sequentially in a descending order of less constrained routing strategies to lower routing isolation priorities. The ICRT 116 can output the routing strategies and/or the results of applying the routing strategies and the routing isolation priorities to the output files 112. In an alternate exemplary embodiment, another application (not depicted) applies the routing strategies to the routing isolation priorities. Applying the most restrictive and resource consuming routing strategy in the earliest routing pass provides the most routing freedom and the highest probability of successfully embedding the wires routed with this strategy. Each subsequent routing pass is faced with a more restricted routing freedom due to the increased consumption of available track space from the previously routed wires. Thus, as the track availability decreases from pass to pass, less restrictive routing strategies are applied. This allows the highest probability of embedding wires in a routing field with continuously reduced track availability and routing freedom.

Technical effects may include coupled noise timing violation avoidance in detailed routing for an integrated circuit design. Further technical effects include generating a routing solution that reduces the amount of scenic routing and cumulative wire length for a design, through the creation and application of NITVS metrics for timing paths. Advantages include greater wiring freedom and flexibility, while attempting to prevent the occurrence of all potential path timing violations due to coupled noise. Coupled noise timing violation avoidance may be performed without prior knowledge of the eventual actual wire routes and their resulting net-to-net coupling scenarios.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for coupled noise timing violation avoidance in detailed routing connections of an integrated circuit design, comprising:
   calculating using a computer a noise induced timing violation sensitivity (NITVS) metric for different routings in the integrated circuit design as a measure of sensitivity to a timing violation relative to an amount of delay added by coupled noise between connections;
   prioritizing the different routings based on isolation required of the different routings as a function of the NITVS metric for each of the different routings to avoid coupled noise timing violations;
   determining a set of routing strategies characterized by varying strength of routing constraint; and
   applying a most constrained routing strategy in the set of routing strategies to a highest routing isolation priority; and
   applying remaining routing strategies sequentially in a descending order of less constrained routing strategies to lower routing isolation priorities.

2. The method of claim 1 further comprising for each of the nets:
   determining a noise induced timing slack status; and
   prioritizing routing isolation as a function of the noise induced timing slack status.

3. The method of claim 2 wherein the noise induced timing slack status assigns each of the nets to one of a positive timing slack region and a negative timing slack region.

4. The method of claim 3 wherein prioritizing the routing isolation assigns the highest routing isolation priority to one or more nets with a lowest NITVS Metric in the negative timing slack region.

5. The method of claim 3 wherein prioritizing the routing isolation assigns the lowest routing isolation priority to one or more nets with a highest NITVS metric in the positive timing slack region.

6. The method of claim 1 further comprising:
   determining a timing slack distribution without noise for the nets; and
   applying a noise model to the nets to produce a coupled noise timing slack distribution.

7. The method of claim 1 further comprising:
   receiving a timing slack distribution without noise for the nets;
   receiving a coupled noise timing slack distribution for the nets; and
   calculating the amount of delay added by coupled noise as a difference in timing slack between the coupled noise timing slack distribution and the timing slack distribution without noise for each of the nets.

8. The method of claim 1 wherein the NITVS metric for a single net path is calculated as a ratio of a no-noise positive slack ballast to a coupled noise path delay adder.

9. The method of claim 1 wherein the NITVS metric for one or more nets in a multi-net path is calculated as a ratio of a no-noise positive slack ballast to a summation of one or more net delay deltas for the one or more nets, wherein the summation of all net delay deltas in the multi-net path is equivalent to a coupled noise path delay adder for the multi-net path.

10. A system for coupled noise timing violation avoidance in detailed routing of an integrated circuit design, comprising:
a data storage device holding design data for the integrated circuit design; and
a host system in communication with the data storage device, the host system executing an integrated circuit routing tool (ICRT), the ICRT performing:
calculating a noise induced timing violation sensitivity (NITVS) metric for nets in the integrated circuit design as a measure of sensitivity to a timing violation relative to an amount of delay added by coupled noise between connections;
prioritizing different routings based on isolation of the routings as a function of the NITVS metric for each of the nets to avoid coupled noise timing violations;
determining a set of routing strategies characterized by varying strength of routing constraint;
applying a most constrained routing strategy in the set of routing strategies to a highest routing isolation priority; and
applying remaining routing strategies sequentially in a descending order of less constrained routing strategies to lower routing isolation priorities.

11. The system of claim 10 wherein the ICRT further performs for each of the nets:
determining a noise induced timing slack status, wherein the noise induced timing slack status assigns each of the nets to one of a positive timing slack region and a negative timing slack region; and
prioritizing routing isolation as a function of the noise induced timing slack status.

12. The system of claim 11 wherein prioritizing the routing isolation assigns the highest routing isolation priority to one or more nets with a lowest NITVS metric in the negative timing slack region, and assigns the lowest routing isolation priority to one or more nets with a highest NITVS metric in the positive timing slack region.

13. The system of claim 10 further comprising:
a timing analysis tool (TAT), the TAT performing:
determining a timing slack distribution without noise for the nets; and
applying a noise model to the nets to produce a coupled noise timing slack distribution.

14. The system of claim 10 wherein the ICRT further performs:
receiving a timing slack distribution without noise for the nets;
receiving a coupled noise timing slack distribution for the nets; and
calculating the amount of delay added by coupled noise as a difference in timing slack between the coupled noise timing slack distribution and the timing slack distribution without noise for each of the nets.

* * * * *